(12) United States Patent
Uehara et al.

(10) Patent No.: US 11,421,925 B2
(45) Date of Patent: Aug. 23, 2022

(54) CONTAINER REFRIGERATION APPARATUS WITH IMPACT EVENT ASSESSMENT AND ABNORMALITY DIAGNOSIS

(71) Applicant: DAIKIN INDUSTRIES, LTD., Osaka (JP)

(72) Inventors: Yoshikazu Uehara, Osaka (JP); Kazuhide Mizutani, Osaka (JP); Makoto Ikemiya, Osaka (JP); Norio Iga, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/340,198

(22) Filed: Jun. 7, 2021

(65) Prior Publication Data

US 2021/0293460 A1    Sep. 23, 2021

Related U.S. Application Data

(63) Continuation of application No. PCT/JP2019/040651, filed on Oct. 16, 2019.

(30) Foreign Application Priority Data

Dec. 21, 2018 (JP) .............................. JP2018-240128

(51) Int. Cl.
*F25B 49/02* (2006.01)
*F25D 29/00* (2006.01)

(52) U.S. Cl.
CPC ............ *F25B 49/02* (2013.01); *F25D 29/006* (2013.01); *F25B 2500/06* (2013.01); *F25B 2500/222* (2013.01)

(58) Field of Classification Search
CPC ............ F25B 2500/06; F25B 2500/222; F25B 49/005; F25B 49/02; F25D 11/00; F25D 29/00; F25D 29/006
See application file for complete search history.

(56) References Cited

U.S. PATENT DOCUMENTS 6,427,473 B1 *  8/2002  Kurokawa ............ F25D 11/006
                                              62/430
2004/0252053 A1 * 12/2004 Harvey ................. G01S 19/235
                                              342/357.75
(Continued)

FOREIGN PATENT DOCUMENTS

EP    3 115 719 A1    1/2017
JP    6-123529 A      5/1994
(Continued)

OTHER PUBLICATIONS

English translation of International Preliminary Report on Patentability and Written Opinion of the International Searching Authority for International Application No. PCT/JP2019/040651, dated Jul. 1, 2021.

(Continued)

*Primary Examiner* — Henry T Crenshaw
(74) *Attorney, Agent, or Firm* — Birch, Stewart, Kolach & Birch, LLP

(57) ABSTRACT

A container refrigeration apparatus includes a refrigeration cycle unit having a refrigerant circuit, and a controller configured to control an action of the refrigeration cycle unit to adjust a temperature of inside air in a container to a desired temperature. The controller is configured to include an impact determination section configured to determine whether or not a strong impact acted on the container, and an abnormality diagnosis section configured to perform an abnormality diagnosis to diagnose whether or not at least one of the container or the container refrigeration apparatus has an abnormality when the impact determination section determines that a strong impact acted on the container.

6 Claims, 11 Drawing Sheets

(56) References Cited

U.S. PATENT DOCUMENTS

| | | | |
|---|---|---|---|
| 2005/0097920 A1* | 5/2005 | Ezaki | F25B 41/31 |
| | | | 62/527 |
| 2005/0210894 A1* | 9/2005 | Hirota | F25B 45/00 |
| | | | 62/149 |
| 2010/0205999 A1* | 8/2010 | Ikemiya | F25D 19/003 |
| | | | 62/440 |
| 2014/0067313 A1* | 3/2014 | Breed | G01P 15/02 |
| | | | 702/141 |
| 2015/0121923 A1* | 5/2015 | Rusignuolo | F25D 11/003 |
| | | | 62/428 |
| 2015/0183292 A1* | 7/2015 | Muralidhar | B60H 1/3211 |
| | | | 62/61 |
| 2017/0291473 A1* | 10/2017 | Kim | B60H 1/3217 |
| 2018/0079578 A1* | 3/2018 | Agersbæk | B65D 79/02 |
| 2021/0150467 A1 | 5/2021 | Sakai et al. | |

FOREIGN PATENT DOCUMENTS

| | | | |
|---|---|---|---|
| JP | 10-175426 A | | 6/1998 |
| JP | 2002-115941 | * | 4/2002 |
| JP | 2002-115941 A | | 4/2002 |
| JP | 2003-254646 A | | 9/2003 |
| JP | 2014-204576 A | | 10/2014 |
| JP | 2015-94524 A | | 5/2015 |
| JP | 2017-20671 A | | 1/2017 |
| WO | WO 2018/168031 A1 | | 9/2018 |

OTHER PUBLICATIONS

International Search Report, issued in PCT/JP2019/040651, dated Dec. 3, 2019.
Extended European Search Report for European Application No. 19900446.6, dated Jan. 4, 2022.

* cited by examiner

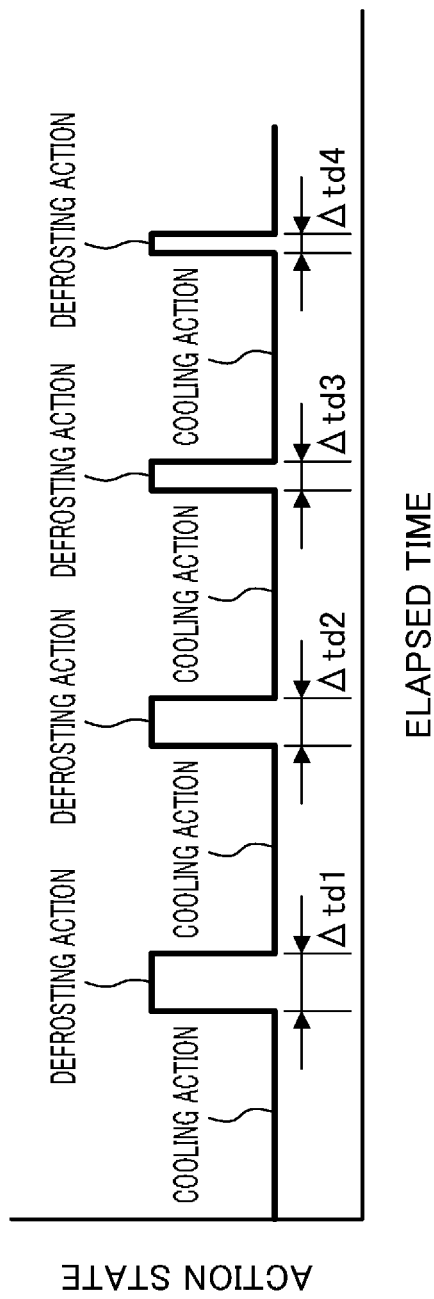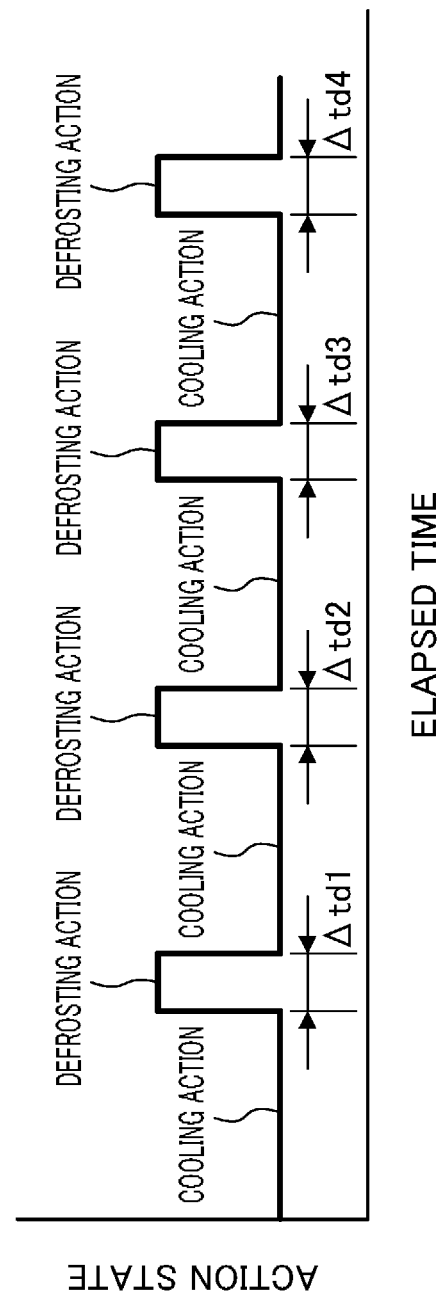

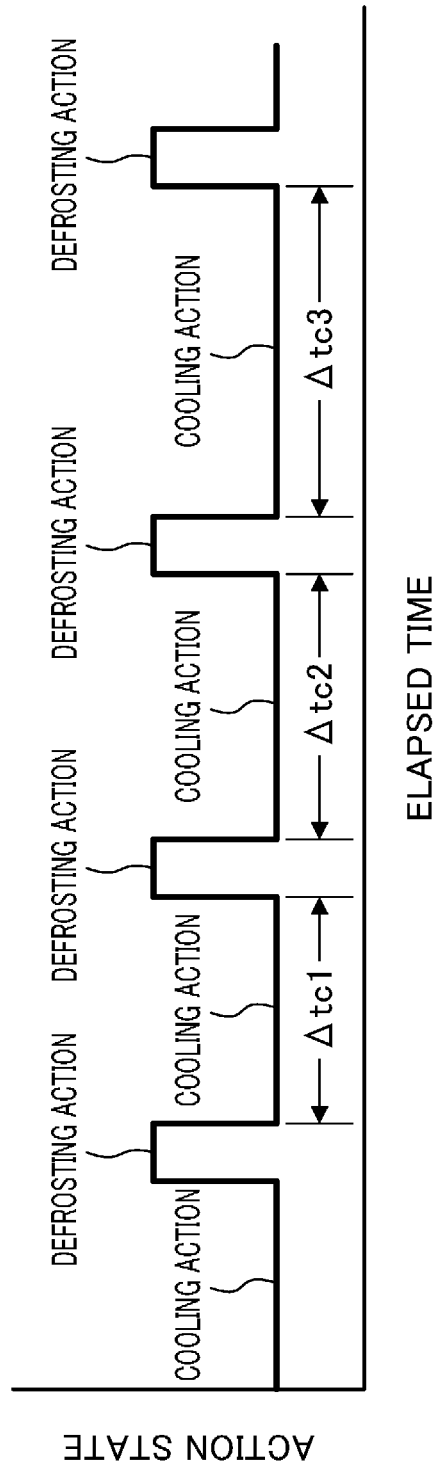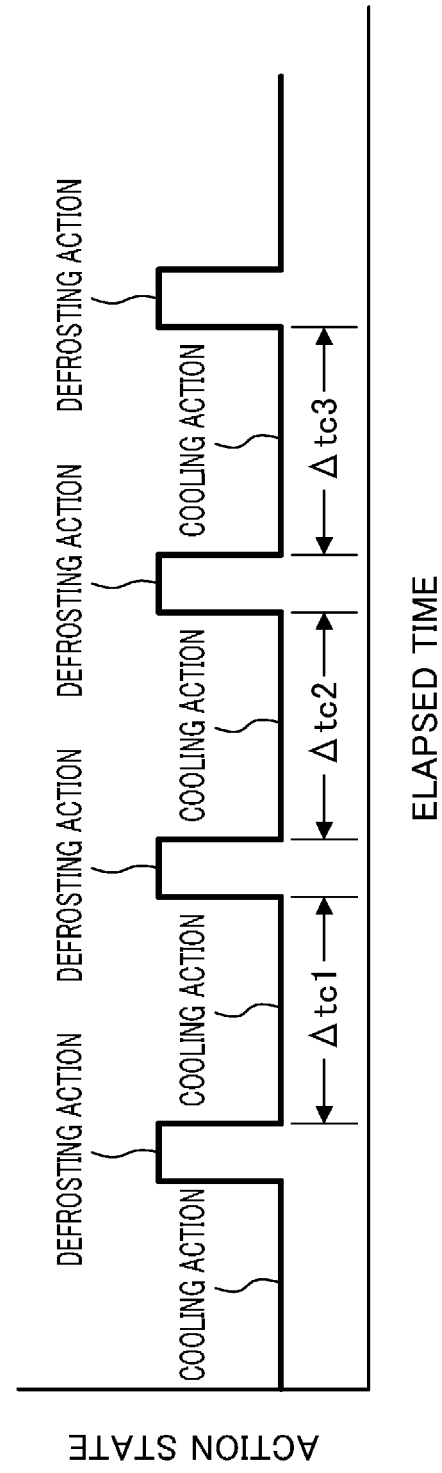

CONTAINER REFRIGERATION APPARATUS WITH IMPACT EVENT ASSESSMENT AND ABNORMALITY DIAGNOSIS

CROSS REFERENCE TO RELATED APPLICATIONS

This application is a Continuation of PCT International Application No. PCT/JP2019/040651, filed on Oct. 16, 2019, which claims priority under 35 U.S.C. 119(a) to Patent Application No. 2018-240128, filed in Japan on Dec. 21, 2018, all of which are hereby expressly incorporated by reference into the present application.

TECHNICAL FIELD

The present disclosure relates to a container refrigeration apparatus.

BACKGROUND ART

A container refrigeration apparatus has been used to cool an interior of a container for use in marine or overland transportation to a temperature appropriate for storing cargos such as plants (see, e.g., Patent Document 1 below). The container refrigeration apparatus is provided in a casing that freely opens and closes an opening of the container and has a refrigerant circuit that performs a vapor compression refrigeration cycle. The container refrigeration apparatus exchanges heat between a low-pressure refrigerant and inside air in an evaporator in the refrigerant circuit provided inside the casing, and circulates the cooled air, thereby cooling the interior of a container.

CITATION LIST

Patent Document

Patent Document 1: Japanese Unexamined Patent Publication No. 2017-20671

SUMMARY

A first aspect of the present disclosure is directed to a container refrigeration apparatus including: a refrigeration cycle unit (30) having a refrigerant circuit (40); and a control unit (80) configured to control an action of the refrigeration cycle unit (30) to adjust a temperature of inside air in a container (11) to a desired temperature. The control unit (80) includes an impact determination section (83) configured to determine whether or not a strong impact acted on the container (11), and an abnormality diagnosis section (84) configured to perform an abnormality diagnosis to diagnose whether or not at least one of the container (11) or the container refrigeration apparatus (10) has an abnormality when the impact determination section (83) determines that a strong impact acted on the container (11). The container refrigeration apparatus further includes: a detector (73, 75) configured to detect a physical quantity for determining whether or not a strong impact acted on the container (11) by the impact determination section (83), and transmit the physical quantity to the control unit (80); a first power source (91) connected to components of the refrigeration cycle unit (30) and configured to supply electric power to the components; and a third power source (93) separate from the first power source (91) and configured to supply electric power to the controller (80) and the detector (73, 75).

BRIEF DESCRIPTION OF THE DRAWINGS

FIG. 9A is a graph illustrating a relationship between an action state and time that has elapsed during the diagnostic operation, for diagnosis of no abnormality in the container in abnormality diagnosis of a third embodiment. FIG. 9B is a graph illustrating a relationship between an action state and time that has elapsed during the diagnostic operation, for diagnosis of an abnormality in the container in abnormality diagnosis of the third embodiment.

FIG. 10A is a graph illustrating a relationship between an action state and time that has elapsed during the diagnostic operation, for diagnosis of no abnormality in the container in abnormality diagnosis of a first variation of the third embodiment. FIG. 10B is a graph illustrating a relationship between an action state and time that has elapsed during the diagnostic operation, for diagnosis of an abnormality in the container in abnormality diagnosis of the first variation of the third embodiment.

DESCRIPTION OF EMBODIMENTS

First Embodiment

A first embodiment will be described with reference to the drawings.

—Configuration of Container Refrigeration Apparatus—

Figure 1:
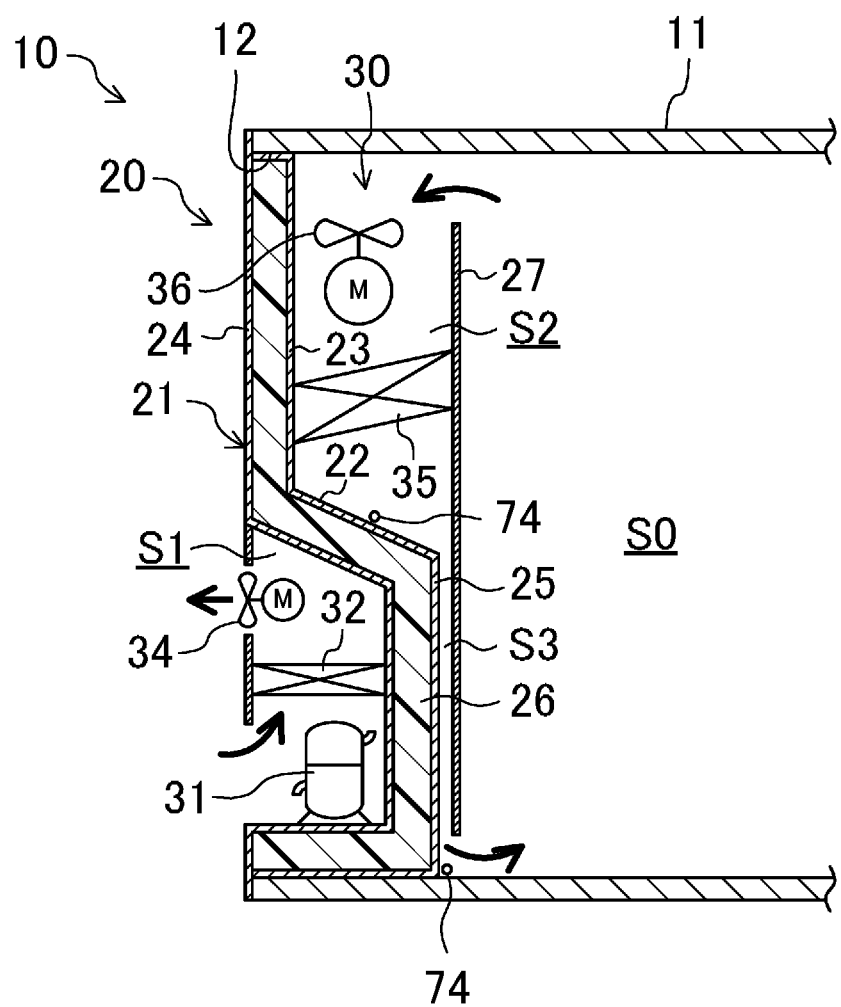
FIG. 1 is a vertical cross-sectional view of a container refrigeration apparatus according to a first embodiment.
Figure 2:
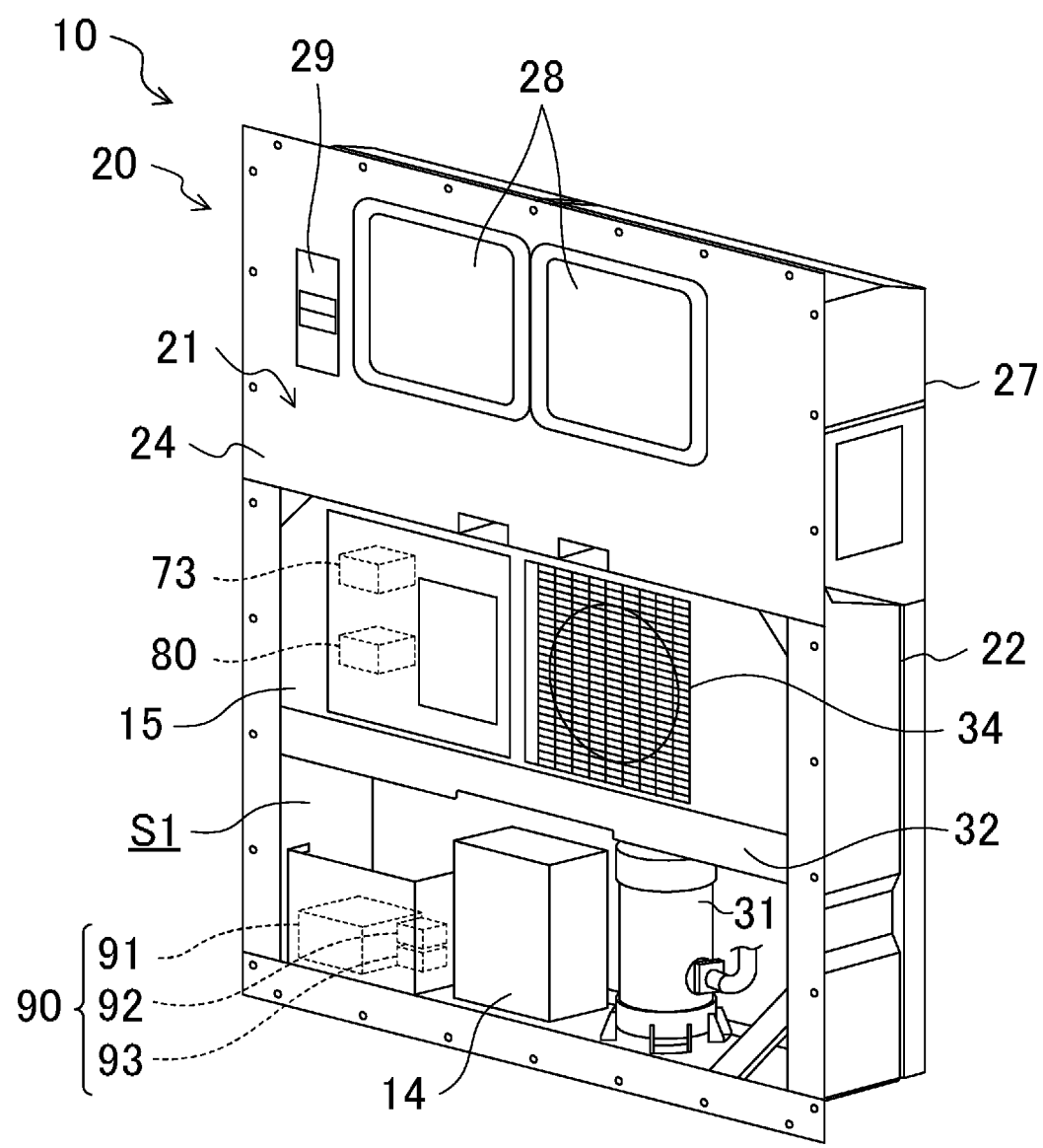
FIG. 2 is a perspective view of the container refrigeration apparatus of the first embodiment as viewed from outside.
Figure 3:
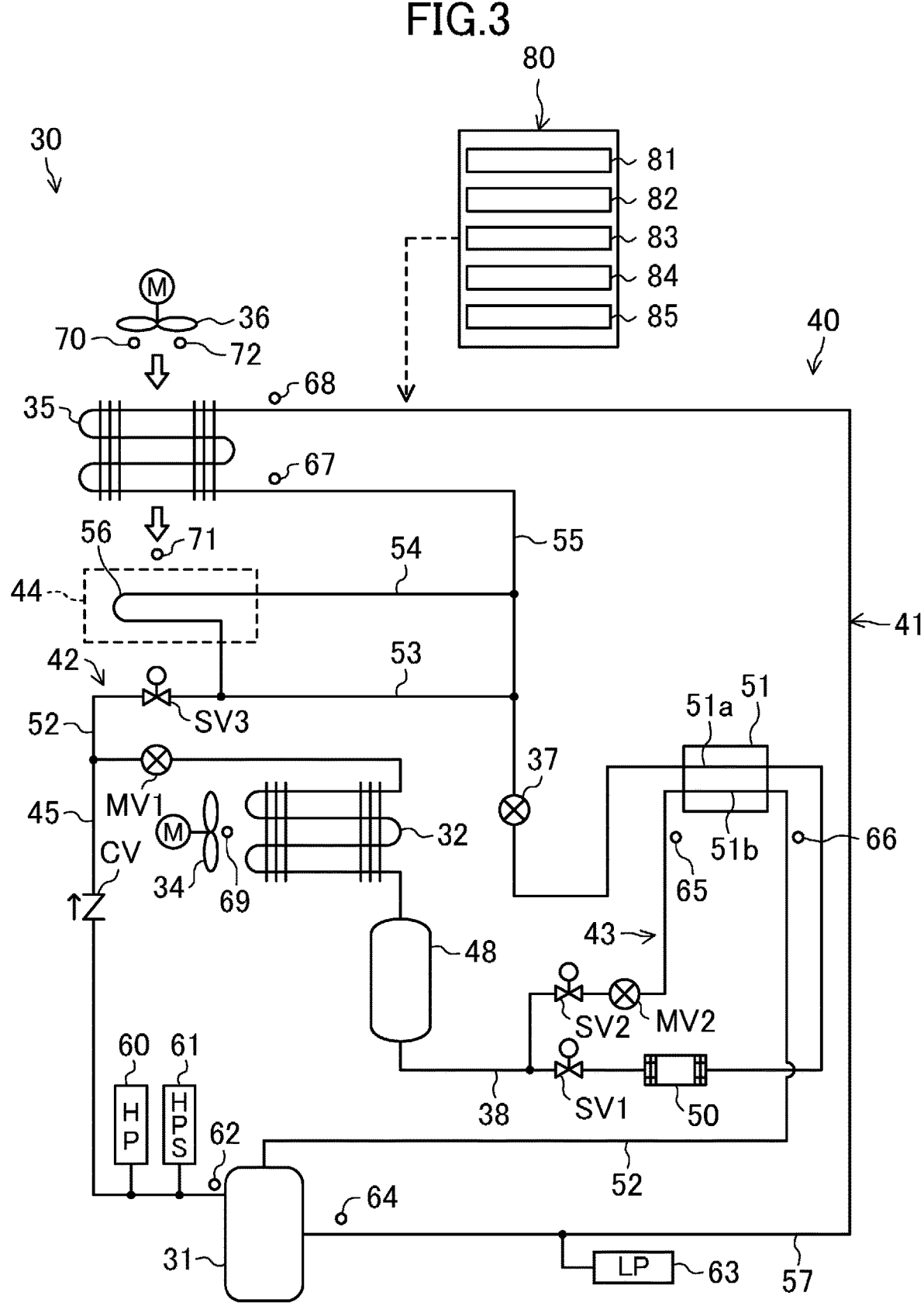
FIG. 3 is a piping diagram of a refrigeration cycle unit of the first embodiment.
Figure 4:
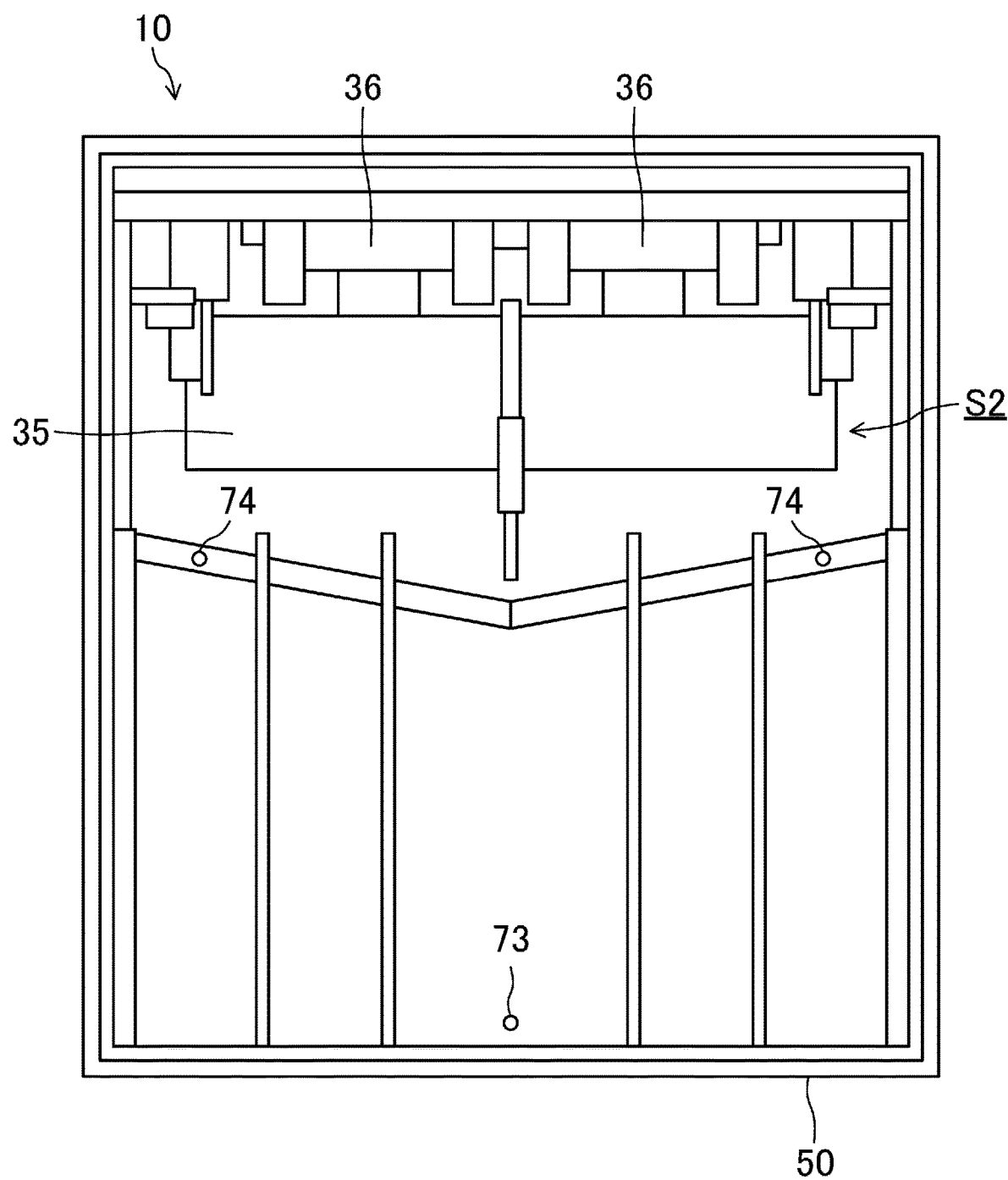
FIG. 4 is a side view of the container refrigeration apparatus of the first embodiment as viewed from inside.

As shown in FIGS. 1 to 3, a container refrigeration apparatus (10) of the first embodiment is for cooling an interior of a container (11) used for marine transportation. The container refrigeration apparatus (10) includes a casing (20) serving as a lid for closing an opening (12) in a side portion of the container (11), a refrigeration cycle unit (30) having a refrigerant circuit (40) configured to circulate a refrigerant to perform a refrigeration cycle, a controller (control unit) (80), a GPS receiver (73), a refrigerant sensor (refrigerant leakage detection unit) (74), and a power source unit (90).

<Casing>

The casing (20) includes a casing body (21) for partitioning between outside and inside of the container, and a partition plate (27) provided on a back surface (inner side) of the casing (20).

The casing body (21) has a protrusion (22) formed at its lower portion and protruding toward the inside of the container, and a flat plate portion (23) formed at its upper portion and is substantially flush with the opening (12) of the container (11). In the casing body (21), an inside space of a recess formed outside the protrusion (22) is configured as an external storage space (S1), and an inner space of the container (11) than the flat plate portion (23) above the protrusion (22) is configured as an internal storage space (S2). The flat plate portion (23) is provided with access ports (28) and a ventilator (ventilating device) (29). The access port (28) is a viewing window having a door that can be opened and closed in the maintenance. Two access ports (28) are provided side by side. The ventilator (29) is a ventilating device for ventilating the interior of the container, and the action thereof is controlled by a controller (80).

The casing body (21) includes three members (24, 25, and 26) having substantially the same shape and being stacked in the thickness direction. Specifically, the casing body (21) includes an external casing (24) facing the outside of the container (11), an internal casing (25) facing the inside of the container (11), and a heat-insulating layer (26) provided between the external casing (24) and the internal casing (25). In the first embodiment, the external casing (24) is made from aluminum, the internal casing (25) is made from fiber-reinforced plastic (FRP), and the heat-insulating layer (26) is made from foamed resin.

The external storage space (S1) stores a compressor (31), a radiator (condenser) (32), an external fan (34), an inverter box (14), and an electric component box (15), which will be described later. The internal storage space (S2) is provided with an evaporator (35) and an internal fan (36), which will be described later. The space between the protrusion (22) and the partition plate (27) is configured as an air passage (S3) through which the inside air flows. An upper end of the air passage (S3) is in communication with the internal storage space (S2), and a lower end of the same is in communication with the interior of the container (11).

<Refrigeration Cycle Unit>

The refrigeration cycle unit (30) includes a refrigerant circuit (40) configured to circulate a refrigerant to perform a vapor compression refrigeration cycle, an external fan (34), and an internal fan (36).

The refrigerant circuit (40) includes a main circuit (41), a hot gas bypass circuit (42), and a subcooling circuit (43). In the main circuit (41), the compressor (31), the radiator (32), an expansion valve (37), and the evaporator (35) are serially connected in this order.

The compressor (31) includes a motor (not shown) for driving a compression mechanism. The number of revolutions of the motor in the compressor (31) is controlled in multiple stages by an inverter. That is, the compressor (31) is configured to have a variable operating capacity. A circuit board of the inverter connected to the compressor (31) is stored in the inverter box (14).

The radiator (32) is a fin-and-tube heat exchanger. As described above, the radiator (32) is disposed in the external storage space (S1). The external fan (34) is provided in the vicinity of the radiator (32). The radiator (32) exchanges heat between outside air supplied from the external fan (34) and a refrigerant. The external fan (34) is driven by a fan motor, and the number of revolutions of the fan motor is controlled in multiple stages. The circuit board connected to the fan motor is stored in the electric component box (15).

The expansion valve (37) is configured such that an opening degree thereof is adjustable in multiple stages using a pulse motor.

The evaporator (35) is a fin-and-tube heat exchanger. As described above, the evaporator (35) is disposed in the internal storage space (S2). The evaporator (35) includes a plurality of U-shaped tubes having both ends connected to a header provided at its one end in the lateral direction. Flowing through the plurality of U-shaped tubes, the refrigerant exchanges heat with and cool the surrounding inside air.

The internal fan (36) is provided in the vicinity of the evaporator (35). In the evaporator (35), heat is exchanged between the refrigerant and the inside air supplied from the internal fan (36). The internal fan (36) supplies air that has been cooled in the evaporator (35) to the interior of the container (11). The internal fan (36) is driven by a fan motor. The number of revolutions of the fan motor is controlled in multiple stages. The circuit board connected to the fan motor is stored in the electric component box (15).

A drain pan (44) is provided under the evaporator (35). The drain pan (44) is formed in a shape of a flat container with an open upper side. Inside the drain pan (44), collected are frost and ice blocks that are fallen off from the evaporator (35), condensed water condensed from the air, and the like.

A check valve (CV) and a first motor-operated valve (MV1) are provided in this order in a high-pressure gas pipe (45) between the compressor (31) and the radiator (32). The check valve (CV) allows the refrigerant to flow in the directions indicated by respective arrows shown in FIG. 1, and disallows the refrigerant to flow in the directions opposite thereto. The first motor-operated valve (MV1) is configured such that its opening degree is adjustable in multiple stages using a pulse motor.

A high-pressure liquid pipe (38) between the radiator (32) and the expansion valve (37) is provided with a receiver (48), a dryer (50), a first open/close valve (SV1), and a plate heat exchanger (51) in this order. The first open/close valve (SV1) is an electromagnetic valve that can be freely opened and closed. The dryer (50) is configured to capture moisture in the liquid refrigerant that has flowed through the radiator (32).

The plate heat exchanger (51) cools the liquid refrigerant that has flowed through the radiator (32). The plate heat exchanger (51) has a primary passage (51*a*) and a secondary passage (51*b*). Specifically, the plate heat exchanger (51) exchanges heat between the refrigerant flowing through the primary passage (51*a*) and the refrigerant flowing through the secondary passage (51*b*). The primary passage (51*a*) is connected to the main circuit (41), and the secondary passage (51*b*) is connected to an injection pipe (52) of the subcooling circuit (43). An inlet end of the injection pipe (52) is connected between the receiver (48) and the first open/close valve (SV1) in the main circuit (41). An outlet end of the injection pipe (52) is connected to a compression chamber of the compressor (31) in the course of compression (in an intermediate pressure state). A second open/close valve (SV2) and a second motor-operated valve (MV2) are provided on the inflow side of the secondary passage (51*b*) in the injection pipe (52). The second open/close valve (SV2) is an electromagnetic valve that can be freely opened and closed. The second motor-operated valve (MV2) has an opening degree that is adjustable in multiple stages using a pulse motor, and constitutes a decompression mechanism to decompress the refrigerant.

The hot gas bypass circuit (42) includes one main pipe (52) and two branch passages (53, 54) (a first branch pipe (53) and a second branch pipe (54)) branching from the main pipe (52). An inlet end of the main pipe (52) is connected to the high-pressure gas pipe (45) between the check valve (CV) and the first motor-operated valve (MV1). The main pipe (52) is provided with a third open/close valve (SV3). The third open/close valve (SV3) is an electromagnetic valve that can be freely opened and closed.

The first branch pipe (53) has one end connected to an outlet end of the main pipe (52) and the other end connected to a low-pressure liquid pipe (55) between the expansion valve (37) and the evaporator (35). Likewise, the second branch pipe (54) has one end connected to the outlet end of the main pipe (52) and the other end connected to the low-pressure liquid pipe (55). The second branch pipe (54) is a refrigerant pipe longer than the first branch pipe (53). The second branch pipe (54) has a drain pan heater (56) arranged in a meandering manner along the bottom of the drain pan (44). The drain pan heater (56) is configured to heat the inside of the drain pan (44) with the refrigerant. As described above, the hot gas bypass circuit (42) serves as a bypass circuit for supplying the refrigerant compressed in the compressor (31) (high-temperature high-pressure gas refrigerant discharged from the compressor (31)) to the evaporator (35).

The refrigerant circuit (40) is provided with various sensors. Specifically, the high-pressure gas pipe (45) is provided with a high-pressure sensor (60), a high-pressure switch (61), and a discharge temperature sensor (62). The high-pressure sensor (60) detects the pressure of the high-pressure gas refrigerant discharged from the compressor (31). The discharge temperature sensor (62) detects the temperature of the high-pressure gas refrigerant discharged from the compressor (31). A low-pressure gas pipe (57) between the evaporator (35) and the compressor (31) is provided with a low-pressure sensor (63) and a suction temperature sensor (64). The low-pressure sensor (63) detects the pressure of the low-pressure gas refrigerant sucked into the compressor (31). The suction temperature sensor (64) detects the temperature of the low-pressure gas refrigerant sucked into the compressor (31).

The injection pipe (52) is provided with a first inflow temperature sensor (65) on the inflow side of the secondary passage (51b) and a first outflow temperature sensor (66) on the outflow side of the secondary passage (51b). The first inflow temperature sensor (65) detects the temperature of the refrigerant immediately before the refrigerant flows into the secondary passage (51b). The first outflow temperature sensor (66) detects the temperature of the refrigerant immediately after the refrigerant flows out of the secondary passage (51b).

The low-pressure liquid pipe (55) is provided with a second inflow temperature sensor (67) on the inflow side of the evaporator (35). The second inflow temperature sensor (67) detects the temperature of the refrigerant immediately before the refrigerant flows into the evaporator (35). The low-pressure gas pipe (57) is provided with a second outflow temperature sensor (68) on the outflow side of the evaporator (35). The second outflow temperature sensor (68) detects the temperature of the refrigerant immediately after the refrigerant flows out of the evaporator (35).

An outside air temperature sensor (69) is provided outside the container (11) and near the suction side of the radiator (32). The outside air temperature sensor (69) detects the temperature of the outside air outside the container (11) before the air passes through the radiator (32) (i.e., temperature of the outside air).

In the container (11), a suction temperature sensor (70) is provided near the suction side of the evaporator (35), and a blow-out temperature sensor (71) is provided near the blow-out side of the evaporator (35). The suction temperature sensor (70) detects the temperature of the inside air immediately before the inside air passes through the evaporator (35). The blow-out temperature sensor (71) detects the temperature of the inside air immediately after the inside air passes through the evaporator (35). Specifically, the suction temperature sensor (70) serves as a temperature detector for detecting the temperature of the inside air.

An internal humidity sensor (72) is provided inside the container (11). The internal humidity sensor (72) detects the humidity of air near the suction side (upstream side) of the evaporator (35). Specifically, the internal humidity sensor (72) serves as a humidity detector that detects the humidity of the inside air that is sent back from the internal space (SO) to the internal storage space (S2).

<GPS Receiver>

As shown in FIG. 2, a GPS receiver (73) is provided outside the container (11). The GPS receiver (73) is configured to receive, from a GPS satellite, a signal including information such as time and orbit of the satellite to determine reception time and a position (coordinates) of the GPS receiver (73) and transmit the results to the controller (80) as position information of the container (11). As will be described in detail later, the controller (80) determines an impact value acted on the container (11) from the position information (moving distance, moving speed, and moving time) on the container (11) received from the GPS receiver (73). In other words, the GPS receiver (73) serves as a detector that detects a physical quantity for determining whether or not a strong impact acted on the container (11).

<Refrigerant Sensor>

As shown in FIG. 1, the refrigerant sensor (74) for detecting a refrigerant that has leaked from the refrigerant circuit (40) into the container (11) is provided in the container (11). In the first embodiment, the refrigerant sensor (74) is for measuring a change in a resistance value that decreases with an increase in free electrons inside the sensor caused by desorption of oxygen ions adsorbed on the surface of a metal oxide semiconductor, from the surface, in response to the reaction with the refrigerant, to determine the concentration of the refrigerant. The concentration of the refrigerant detected using the refrigerant sensor (74) is transmitted to the controller (80). In the first embodiment, a total of three refrigerant sensors (74) are provided: one below each end of the evaporator (35) in the lateral direction, and one below the air passage (S3) between the protrusion (22) and the partition plate (27). The three refrigerant sensors (74) constitute a refrigerant leakage detection unit that detects a leakage (concentration in the first embodiment) of the refrigerant from the refrigerant circuit (40). Note that the number of refrigerant sensors (74) is not limited to three. One, two, four, or more refrigerant sensors (74) may be provided.

<Controller>

The container refrigeration apparatus (10) is provided with the controller (80) serving as a control unit for controlling the refrigerant circuit (40). Specifically, the controller (80) controls, for example, the number of revolutions of the motor of the compressor (31), the number of revolutions of the motors of the fans (34 and 36), the opening degrees of the motor-operated valves (MV1 and MV2) and the expansion valve (37), and opening and closing of the open/close valves (SV1, SV2, and SV3), based on the detection signals detected using the various sensors described above. The controller (80) is provided in the electric component box (15).

As shown in FIG. 3, the controller (80) includes a cooling operation control unit (81) and a defrosting operation control unit (82). The cooling operation control unit (81) controls the components of the refrigeration cycle unit (30) to perform a cooling operation to cool the air in the container (11) with the refrigerant in the refrigerant circuit (40). The defrosting operation control unit (82) controls the components of the refrigeration cycle unit (30) to perform a defrosting operation to defrost the evaporator (35) with the refrigerant in the refrigerant circuit (40).

The controller (80) includes an impact determination section (83), an abnormality diagnosis section (84), and a processing section (85). The impact determination section (83) performs an impact determination to determine whether or not a strong impact acted on the container (11). The abnormality diagnosis section (84) performs an abnormality diagnosis to diagnose whether or not the container refrigeration apparatus (10) has an abnormality. The processing section (85) performs a predetermined processing action to address the abnormality of the container refrigeration apparatus (10).

Although details will be described later, in the present embodiment, the abnormality diagnosis section (84) is configured to diagnose whether or not the container refrigeration apparatus (10) has an abnormality, based on whether or not the refrigerant has leaked into the container (11). Further, in the present embodiment, the processing section (85) is configured to perform, as the predetermined processing action, a refrigerant discharge action to discharge the refrigerant that has leaked into the container (11) to the outside of the container (11).

In the present embodiment, the controller (80) includes a microcomputer that controls components of the container refrigeration apparatus (10), and a memory or a hard disk that stores an executable control program. Note that the controller (80) is an example of a control unit of the container refrigeration apparatus (10), and the detailed structure and algorithm of the controller (80) may be a combination of any kind of hardware and software that can implement the functions according to the present disclosure.

Note that details of various controls of the controller (80) will be described later.

<Power Source Unit>

The power source unit (90) is provided outside the container (11). The power source unit (90) includes a first power source (91), a second power source (92), and a third power source (93).

The first power source (91) is connected to each of the electric devices of the container refrigeration apparatus (10) and the three refrigerant sensors (74) to supply electric power to them. Specifically, the first power source (91) is connected to an inverter circuit board of the compressor (31), circuit boards of the external fan (34) and the internal fan (36), actuators of the first to third open/close valves (SV1 to SV3), actuators of the first and second motor-operated valves (MV1, MV2), an actuator of the ventilator (29) and an actuator of the expansion valve (37), the various sensors (60, 62 to 72), the high-pressure switch (61), and the three refrigerant sensors (74).

The second power source (92) is connected to the three refrigerant sensors (74) and is configured to supply electric power to the refrigerant sensors (74). In the present embodiment, the second power source (92) is a so-called standby power source that supplies electric power to the three refrigerant sensors (74) with the first power source (91) being in the power-OFF state in which electric power cannot be supplied. In other words, the three refrigerant sensors (74) are connected to both the first and second power sources (91) and (92). In the present embodiment, the second power source (92) is a dry battery, but may also be a photovoltaic power generator or the like.

The third power source (93) is connected to the controller (80) and the GPS receiver (73), and continuously supplies electric power to them.

—Operation of Container Refrigeration Apparatus—

Next, the operation of the container refrigeration apparatus (10) will be described. The container refrigeration apparatus (10) is configured to perform a cooling operation as a normal operation and perform a defrosting operation to melt frost that has formed on the evaporator (35) as appropriate. Further, the container refrigeration apparatus (10) is configured to perform the impact determination to determine whether or not a strong impact acted on the container (11), the abnormality diagnosis to diagnose whether or not the container refrigeration apparatus (10) has an abnormality, and the predetermined processing action (refrigerant discharge action in the present embodiment) to address the abnormality of the container refrigeration apparatus (10).

<Cooling Operation>

Figure 5:
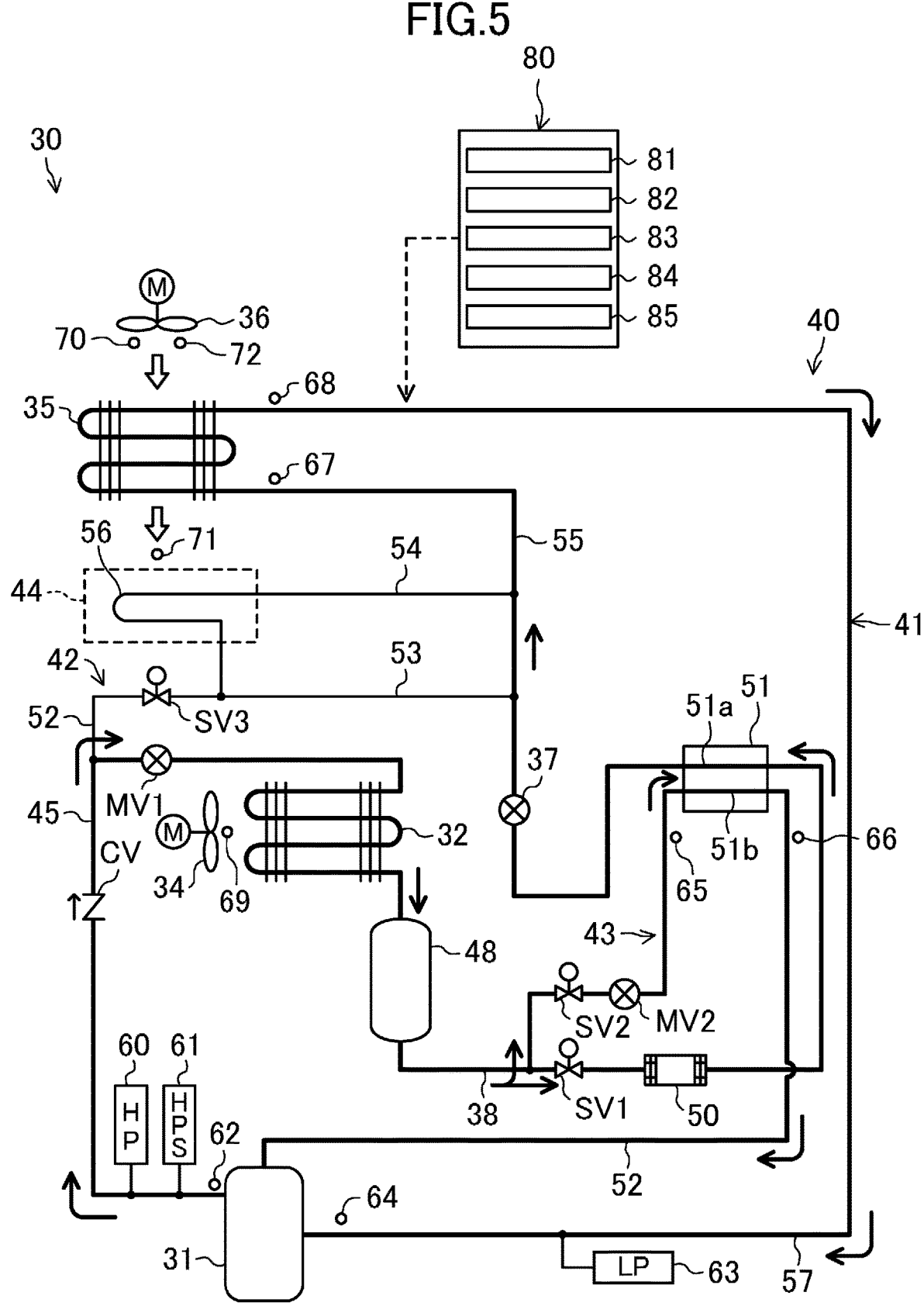
FIG. 5 is a piping diagram of a refrigeration cycle unit of the first embodiment, and illustrates a flow of a refrigerant in a cooling operation.

The basic cooling operation will be described with reference to FIGS. 1 and 5.

The cooling operation is performed by the cooling operation control unit (81) of the controller (80). The cooling operation control unit (81) controls the first open/close valve (SV1) to be open, the third open/close valve (SV3) to be closed, and the first motor-operated valve (MV1) to be fully open, and adjusts the opening degrees of the second motor-operated valve (MV2) and the expansion valve (37) as appropriate. The cooling operation control unit (81) causes the compressor (31), the external fan (34), and the internal fan (36) to operate.

The refrigerant compressed in the compressor (31) flows through the high-pressure gas pipe (45) into the radiator (32), is condensed (dissipates heat) in the radiator (32), and then passes through the receiver (48). Part of the refrigerant that has passed through the receiver (48) flows through the high-pressure liquid pipe (38), and the rest of the refrigerant flows into the injection pipe (52). The refrigerant that has flowed through the high-pressure liquid pipe (38) is decompressed at the expansion valve (37), and then flows through the low-pressure liquid pipe (55) into the evaporator (35). In the evaporator (35), the refrigerant absorbs heat from the inside air and evaporates. Thus, the air in the internal space (S0) is cooled by the refrigerant. The refrigerant that has evaporated with the evaporator (35) is sucked into the compressor (31).

On the other hand, the refrigerant that has flowed into the injection pipe (52) is decompressed to an intermediate pressure (between the high and low pressures) at the second motor-operated valve (MV2), and then flows into the secondary passage (51*b*) of the plate heat exchanger (51). The plate heat exchanger (51) exchanges heat between the refrigerant flowing through the primary passage (51*a*) and the refrigerant flowing through the secondary passage (51*b*). As a result, the refrigerant in the primary passage (51a) is supercooled, while the refrigerant in the secondary passage (51b) evaporates. The refrigerant that has flowed out of the secondary passage (51b) is sucked into the compression chamber in the intermediate pressure state (in the middle of the compression process) through an intermediate port of the compressor (31).

In the cooling operation, the cooling operation control unit (81) controls the number of revolutions of the motor of the compressor (31) (i.e., the operation frequency of the compressor (31)). Specifically, the operation frequency of the compressor (31) is controlled such that an internal temperature SS approaches a target temperature SP. More specifically, the operation frequency of the compressor (31) during the cooling operation is adjusted by a PID control so that the internal temperature SS converges to the target temperature SP. Further, during the cooling operation, the cooling operation control unit (81) controls the number of revolutions of the motor of the external fan (34). Specifically, the number of revolutions of the motor of the external fan (34) is controlled such that a pressure HP of the high-pressure refrigerant detected using the high-pressure sensor (60) is constant. The number of revolutions of the motor of the internal fan (36) is controlled in multiple stages according to the internal cooling load.

During the cooling operation, the cooling operation control unit (81) adjusts the opening degree of the expansion valve (37) by a so-called superheat control. Specifically, the opening degree of the expansion valve (37) is controlled so that the degree of superheat of the low-pressure refrigerant sucked into the compressor (31) approaches a predetermined set degree of superheat. Further, during the cooling operation, the cooling operation control unit (81) also adjusts the opening degree of the second motor-operated valve (MV2) by the so-called superheat control. Specifically, the opening degree of the expansion valve (37) is controlled so that the degree of superheat of the intermediate-pressure refrigerant that has flowed out of the secondary passage (51b) of the plate heat exchanger (51) approaches a predetermined set degree of superheat.

<Defrosting Operation>

Continuing of the above-described cooling operation causes frost to be formed on the surfaces of the heat transfer tubes of the evaporator (35), and this frost gradually grows and spreads. Therefore, in the container refrigeration apparatus (10), the defrosting operation to defrost the evaporator (35) is performed between normal operations (cooling operations) as appropriate.

The defrosting operation is performed by the defrosting operation control unit (82) of the controller (80). In the first embodiment, the defrosting operation control unit (82) performs the defrosting operation if a difference (EOS-EIS) between a temperature EIS of the refrigerant flowing into the evaporator (35) and a temperature EOS of the refrigerant flowing out of the evaporator (35) is smaller than a reference value X1 during the cooling operation.

Figure 6:
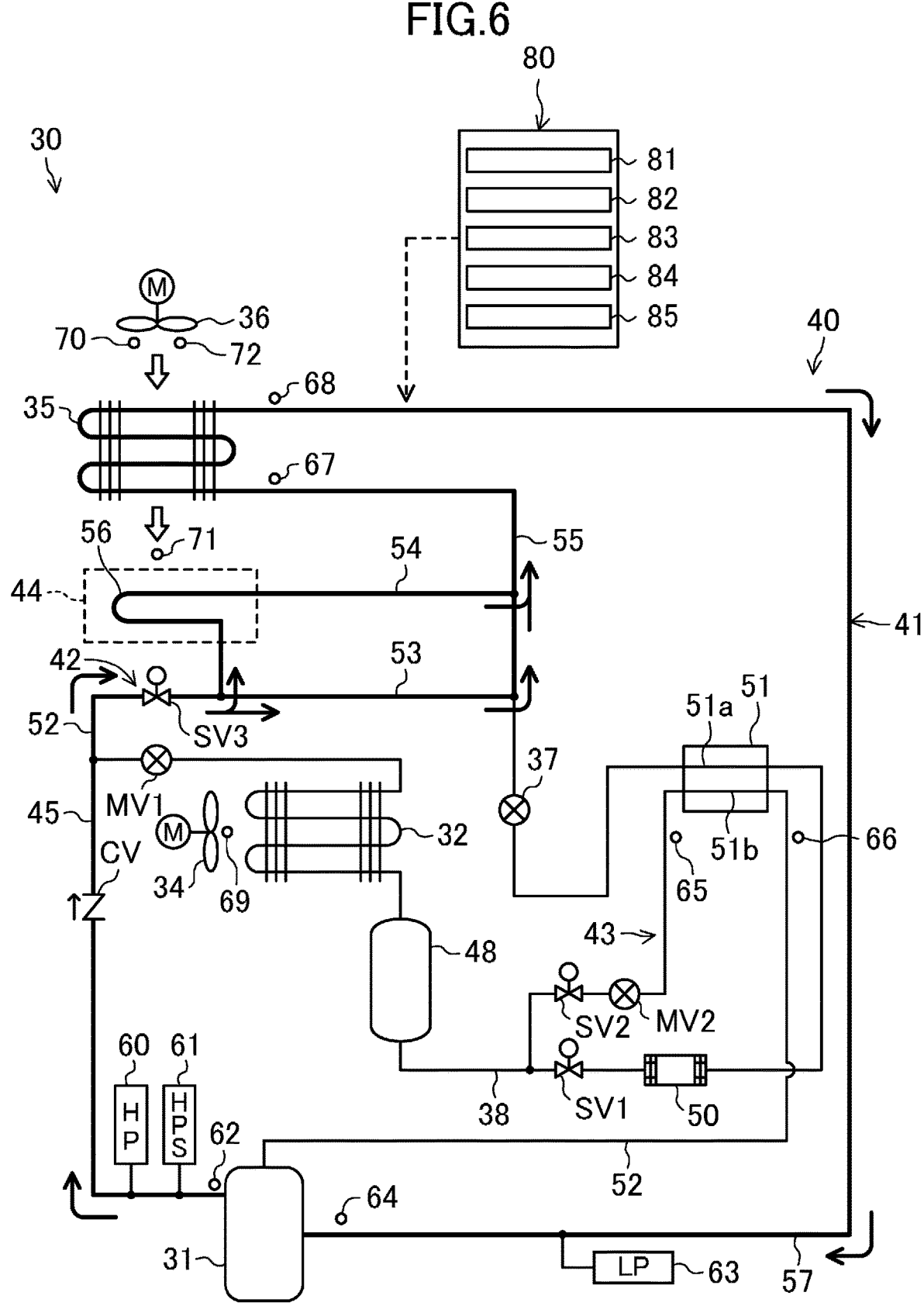
FIG. 6 is a piping diagram of a refrigeration cycle unit of the first embodiment, and illustrates a flow of the refrigerant in a defrosting operation.

In the first embodiment, the defrosting operation control unit (82) performs a defrosting operation of a so-called hot gas defrost type. Specifically, as shown in FIG. 6, the defrosting operation control unit (82) controls the first and second open/close valves (SV1) and (SV2) to be closed, the third open/close valve (SV3) to be open, the first motor-operated valve (MV1) to have a minimum opening degree, and the second motor-operated valve (MV2) and the expansion valve (37) to be fully closed (zero pulses). The defrosting operation control unit (82) operates the compressor (31) and controls the external fan (34) and the internal fan (36) to be at rest.

The refrigerant compressed in the compressor (31) is supplied to the evaporator (35) through the hot gas bypass circuit (42). Specifically, the high-pressure gas refrigerant flows through the main pipe (52) and then flows into the first and second branch pipes (53) and (54). Part of the refrigerant that has flowed into the second branch pipe (54) passes through the drain pan heater (56). In the drain pan (44), ice blocks that have fallen off from the surface of the evaporator (35) are collected. The ice blocks are heated by the refrigerant flowing through the drain pan heater (56), thereby melting. The water generated by the melting is discharged to the outside of the container (11) through a predetermined flow path.

The part of the refrigerant that has flowed out of the drain pan heater (56) merges with the part of the refrigerant that has flowed out of the first branch pipe (53), and then flows into the evaporator (35). In the evaporator (35), the high-pressure gas refrigerant (so-called hot gas) flows through the heat transfer tubes. Therefore, in the evaporator (35), the frost formed on the periphery of the heat transfer tubes is gradually heated from the inside by the refrigerant.

As a result, the frost formed on the evaporator (35) is gradually melted and fallen off from the heat transfer tubes. The frost (ice blocks) that has fallen off from the heat transfer tubes is collected in the drain pan (44). The refrigerant that has used to defrost the evaporator (35) is sucked into and compressed using the compressor (31).

The frost (ice blocks) that has fallen off from the evaporator (35) during the defrosting operation is collected in the drain pan (44) and then heated by the drain pan heater (56) to be liquid. The liquid (so-called drain water) is discharged from the drain pan (44) to the outside of the container (11) through a predetermined discharge path.

The defrosting operation control unit (82) ends the defrosting operation if the difference (EOS-EIS) in temperature in the evaporator (35) is larger than a reference value X2.

<Impact Determination>

The impact determination section (83) of the controller (80) performs the impact determination to determine whether or not a strong impact acted on the container (11). The impact determination section (83) determines whether or not a strong impact acted on the container (11) based on the detection value from the GPS receiver (73).

Specifically, the GPS receiver (73) receives, from a GPS satellite, a signal including information such as time and orbit of the satellite to determine reception time and a position (coordinates) of the GPS receiver (73) and transmits the results to the controller (80) as position information of the container (11). The impact determination section (83) calculates an impact value (acceleration) acted on the container (11) from a change in the positional information of the container (11) received from the GPS receiver (73), specifically, a moving distance before and after the movement of the container (11), and a moving speed and moving time of the container (11). The impact determination section (83) determines that a strong impact acted on the container (11) if the calculated impact value is equal to or greater than a predetermined value (e.g., 50 G), and determines that a strong impact has not acted on the container (11) if the calculated impact value is smaller than the predetermined value (e.g., 50 G).

The impact determination section (83) calculates the impact value by setting the start time point of the change in the position (coordinates) of the GPS receiver (73) as the start time of the movement and setting the end time point of the change in the position (coordinates) of the GPS receiver (73) which does not occur for a predetermined time (e.g., 15 seconds) as the end time of the movement.

<Abnormality Diagnosis>

The abnormality diagnosis section (84) of the controller (80) performs the abnormality diagnosis to diagnose whether or not the container refrigeration apparatus (10) has an abnormality. The abnormality diagnosis is performed when the impact determination section (83) determines that a strong impact acted on the container (11). In the present embodiment, the abnormality diagnosis is performed after a predetermined time (e.g., three minutes) has elapsed since the impact determination section (83) determined that a strong impact acted on the container (11).

In the abnormality diagnosis, the abnormality diagnosis section (84) first makes the three refrigerant sensors (74) detect the concentration of the refrigerant. At this time, with the first power source (91) being in the power-ON state in which electric power can be supplied, the abnormality diagnosis section (84) makes the first power source (91) supply electric power to the three refrigerant sensors (74) to make the refrigerant sensors (74) detect the concentration of the refrigerant. On the other hand, with the first power source (91) being in the power-OFF state in which electric power cannot be supplied, the abnormality diagnosis section (84) makes the second power source (92) serving as a standby power source supply electric power to the three refrigerant sensors (74) to make the refrigerant sensors (74) detect the concentration of the refrigerant.

The abnormality diagnosis section (84) determines whether or not the refrigerant has leaked into the container (11) from the refrigerant circuit (40) based on the concentration of the refrigerant transmitted from the three refrigerant sensors (74). Specifically, the abnormality diagnosis section (84) determines that the refrigerant has leaked from the refrigerant circuit (40) if at least one of the concentrations of the refrigerant transmitted from the three refrigerant sensors (74) exceeds a predetermined first concentration. On the other hand, if all of the concentrations of the refrigerant transmitted from the three refrigerant sensors (74) are equal to or lower than the first concentration, the abnormality diagnosis section (84) determines that the refrigerant has not leaked from the refrigerant circuit (40).

If the abnormality diagnosis section (84) determines that the refrigerant has leaked from the refrigerant circuit (40), the abnormality diagnosis section (84) diagnoses that the container refrigeration apparatus (10) has an abnormality, and makes a memory (not shown) store abnormality flag ON (information indicating that it has been diagnosed that the container refrigeration apparatus (10) has an abnormality). On the other hand, if the abnormality diagnosis section (84) determines that the refrigerant has not leaked from the refrigerant circuit (40), the abnormality diagnosis section (84) diagnoses that the container refrigeration apparatus (10) does not have an abnormality, and makes the memory (not shown) store abnormality flag OFF (information indicating that it has been diagnosed that the container refrigeration apparatus (10) has no abnormality).

<Processing Action>

The predetermined processing action to address the abnormality in the container refrigeration apparatus (10) is performed by the processing section (85) of the controller (80). The predetermined processing action is performed when the abnormality diagnosis section (84) determines that the container refrigeration apparatus (10) has an abnormality, that is, when the abnormality flag is ON.

In the present embodiment, the processing section (85) performs the refrigerant discharge action of causing the internal fan (36) to operate and activating the ventilator (29) to discharge the leaked refrigerant together with the inside air, as the predetermined processing action to address the abnormality in the container refrigeration apparatus (10).

When the abnormality diagnosis section (84) determines that the container refrigeration apparatus (10) has an abnormality (the abnormality flag is ON) with the first power source (91) being in the power-ON state in which electric power can be supplied, the processing section (85) performs the refrigerant discharge action immediately.

On the other hand, when the abnormality diagnosis section (84) determines that the container refrigeration apparatus (10) has an abnormality (if the abnormality flag is ON) with the first power source (91) being in the power-OFF state in which electric power cannot be supplied, the processing section (85) performs the refrigerant discharge action after the first power source (91) is switched to the power-ON state from the power-OFF state (e.g., the first power source (91) is switched to the power-ON state by the user to cool the interior of the container (11)).

The refrigerant discharge action causes the refrigerant that has leaked from the refrigerant circuit (40) to be discharged to the outside of the container (11) together with the inside air, and the outside air is taken into the container (11). Therefore, it is possible to reduce an increase in the concentration of the refrigerant in the container (11).

The condition for ending the refrigerant discharge action may be any condition as long as it is estimated that a certain amount of the refrigerant that has leaked into the container (11) has been discharged, for example, if the values detected using the three refrigerant sensors (74) fall below the first concentration being a reference for starting the refrigerant discharge action or a second concentration that is lower than the first concentration, or a predetermined time has elapsed.

—Advantages of First Embodiment—

The container refrigeration apparatus (10) of the first embodiment includes a refrigeration cycle unit (30) having a refrigerant circuit (40), and a controller (80) configured to control the operation of the refrigeration cycle unit (30) to adjust the temperature of inside air in the container (11) to a desired temperature. In the container refrigeration apparatus (10) of the first embodiment, the controller (80) includes an impact determination section (83) configured to determine whether or not a strong impact acted on the container (11), and an abnormality diagnosis section (84) configured to perform abnormality diagnosis to diagnose whether or not the container refrigeration apparatus (10) has an abnormality when the impact determination section (83) determines that a strong impact acted on the container (11).

In the first embodiment, the controller (80) is configured to determine whether or not a strong impact acted on the container (11), and to perform the abnormality diagnosis to diagnose whether or not the container refrigeration apparatus (10) has an abnormality when the controller (80) determines that a strong impact acted on the container (11). As described above, in the first embodiment, the abnormality diagnosis is performed as a consequence of the strong impact acted on the container (11). This allows recognition of an abnormality such as breakage of the container refrigeration apparatus (10) occurred due to the strong impact acted on the container (11) without waiting until the timing of the next automatic self-diagnostic operation. Accordingly, the first embodiment enables the container refrigeration apparatus (10) that allows prompt recognition of an abnormality occurred in the container refrigeration apparatus (10) due to a strong impact acted on the container (11), to be provided.

Further, the container refrigeration apparatus (10) of the first embodiment is further provided with the refrigerant sensor (74) as a refrigerant leakage detection unit configured to detect leakage of the refrigerant from the refrigerant circuit (40) into the container (11). In the abnormality diagnosis, the abnormality diagnosis section (84) determines whether or not the refrigerant has leaked from the refrigerant circuit (40), based on the value detected using the refrigerant sensor (74). If the abnormality diagnosis section (84) determines that the refrigerant has leaked from the refrigerant circuit (40), it diagnoses that the container refrigeration apparatus (10) has an abnormality, and if the abnormality diagnosis section (84) determines that the refrigerant has not leaked from the refrigerant circuit (40), it diagnoses the container refrigeration apparatus (10) has no abnormality.

In this way, in the first embodiment, the refrigerant sensor (74) is provided as a refrigerant leakage detection unit for detecting the leakage of the refrigerant from the refrigerant circuit (40), and the abnormality diagnosis section (84) is configured to determine whether or not the refrigerant has leaked from the refrigerant circuit (40), based on the value detected using the refrigerant sensor (74), and to diagnose whether or not the container refrigeration apparatus (10) has an abnormality based on the result of that determination. Such a configuration allows prompt recognition of an abnormality of leakage of the refrigerant into the container (11) caused by breakage of pipes of the container refrigeration apparatus (10) due to a strong impact acted on the container (11). Accordingly, the first embodiment enables the leakage of the refrigerant into the container (11) due to the strong impact acted on the container (11) to be addressed promptly.

In addition to the foregoing configurations, the container refrigeration apparatus (10) of the first embodiment includes a first power source (91) connected to components of the refrigeration cycle unit (30) and configured to supply electric power to the components, and a second power source (92) separate from the first power source (91). The refrigerant sensor (74) is connected to the first power source (91) and the second power source (92). If the impact determination section (83) determines that a strong impact acted on the container (11) with the first power source (91) being in a power-ON state in which electric power can be supplied, the controller (80) makes the first power source (91) supply electric power to the refrigerant sensor (74) to make the refrigerant sensor (74) detect a leakage of the refrigerant from the refrigerant circuit (40). If the impact determination section (83) determines that a strong impact acted on the container (11) with the first power source (91) being in the power-OFF state in which electric power cannot be supplied, the controller (80) makes the second power source (92) supply electric power to the refrigerant sensor (74) to make the refrigerant sensor (74) detect a leakage of the refrigerant from the refrigerant circuit (40).

As described above, in the first embodiment, the refrigerant sensor (74) is connected to the first power source (91) configured to supply electric power to the components of the refrigeration cycle unit (30), and to the second power source (92) separate from the first power source (91). The controller (80) is configured such that the first power source (91) supplies electric power to the refrigerant sensors (74) with the first power source (91) being in the power-ON state in which electric power can be supplied, and the second power source (92) instead of the first power source (91) supplies electric power to the refrigerant sensors (74) with the first power source (91) being in the power-OFF state in which electric power cannot be supplied. Specifically, in the first embodiment, the second power source (92) is provided as a standby power source for supplying electric power to the refrigerant sensor (74) when the first power source (91) serving as the main power source is in the power-OFF state. The first embodiment with such a configuration makes it possible to supply electric power to the refrigerant sensor (74) to determine whether or not the refrigerant has leaked from the refrigerant circuit (40) even when the first power source (91) is in the power-OFF state in which the refrigeration cycle unit (30) does not operate.

In addition to the foregoing configurations, in the container refrigeration apparatus (10) of the first embodiment, the refrigeration cycle unit (30) includes an internal fan (36) provided inside the container (11) and configured to circulate the inside air, and a ventilator (29) that serves as a ventilating device, and allows the inside and the outside of the container (11) to communicate with each other to perform ventilation of the interior of the container (11). The controller (80) includes the processing section (85) configured to perform the refrigerant discharge action of causing the internal fan (36) to operate and activating the ventilator (29) to discharge the leaked refrigerant together with the inside air when the abnormality diagnosis section (84) diagnoses that the container refrigeration apparatus (10) has an abnormality with the first power source (91) being in the power-ON state, and to perform the refrigerant discharge action after the first power source (91) is switched to the power-ON state from the power-OFF state when the abnormality diagnosis section (84) diagnoses that the container refrigeration apparatus (10) has an abnormality with the first power source (91) being in the power-OFF state.

As described above, in the first embodiment, the processing section (85) is configured to perform the refrigerant discharge action of causing the internal fan (36) to operate and activating the ventilator (29) to discharge the leaked refrigerant together with the inside air when the abnormality diagnosis section (84) diagnoses that the container refrigeration apparatus (10) has an abnormality. The processing section (85) is further configured to perform, with the first power source (91) being in the power-OFF state, the refrigerant discharge action after waiting until the first power source (91) is switched to the power-ON state from the power-OFF state. The first embodiment with such a configuration allows, when the refrigerant has leaked into the container (11) due to breakage of pipes in the container refrigeration apparatus (10) caused by a strong impact acted on the container (11), the refrigerant discharge action to be performed to discharge the leaked refrigerant to the outside of the container (11) together with the inside air, and allows the outside air to be taken into the container (11). In this way, an increase in the concentration of the refrigerant in the container (11) is reduced. This allows the refrigerant that has leaked into the container (11) to be substantially prevented from igniting even if a flammable refrigerant is used in the refrigeration cycle unit (30).

In addition to the foregoing configurations, the container refrigeration apparatus (10) of the first embodiment includes a GPS receiver (73) configured to detect positional information of the container (11), the impact determination section (83) calculates an impact value acted on the container (11) based on a change in positional information of the container (11) detected with the GPS receiver (73), and if the calculated impact value is equal to or greater than a predetermined value, the impact determination section (83) determines that a strong impact acted on the container (11), and if the calculated impact value is smaller than the predetermined value, the impact determination section (83) determines that a strong impact has not acted on the container (11).

As described above, in the first embodiment, the GPS receiver (73) configured to detect the position information of the container (11) is provided, and the impact determination section (83) is configured to calculate the impact value acting on the container (11) from a change in positional information (moving distance, moving speed, moving time) of the container (11) detected using the GPS receiver (73), and determine whether or not a strong impact acted on the container (11), based on whether or not the calculated impact value is equal to or greater than the predetermined value. The first embodiment with such a configuration enables inexpensive, easy determination of whether or not a strong impact acted on the container (11).

In addition to the foregoing configurations, in the container refrigeration apparatus (10) of the first embodiment, the abnormality diagnosis section (84) performs the abnormality diagnosis after a predetermined time has elapsed since the impact determination section (83) determined that a strong impact acted on the container (11).

If the container (11) or the container refrigeration apparatus (10) is damaged due to a strong impact acted on the container (11), which causes an abnormality such as a decrease in airtightness or heat insulation of the container (11), or leakage of the refrigerant into the container (11), an influence of the abnormality immediately after the damage is small. Thus, whether or not there is the abnormality cannot be diagnosed accurately.

Therefore, as described above, in the container refrigeration apparatus (10) of the first embodiment, the abnormality diagnosis section (84) is configured to perform the abnormality diagnosis after a predetermined time has elapsed since the impact determination section (83) determined that a strong impact acted on the container (11). In the container refrigeration apparatus (10) of the first embodiment, such a configuration allows the abnormality diagnosis to be accurately performed when a strong impact acts on the container (11).

Second Embodiment

A second embodiment will be described with reference to the drawings. The container refrigeration apparatus (10) of the second embodiment is obtained by changing the abnormality diagnosis performed by the abnormality diagnosis section (84) and the predetermined processing action performed by the processing section (85) in the container refrigeration apparatus (10) of the first embodiment. The following description of the container refrigeration apparatus (10) of the present embodiment will be focused on differences from the container refrigeration apparatus (10) of the first embodiment.

In the second embodiment, the controller (80) of the container refrigeration apparatus (10) includes the cooling operation control unit (81) and the defrosting operation control unit (82), and is configured to perform the cooling operation as the normal operation and perform the defrosting operation as appropriate. In the second embodiment, the controller (80) includes the impact determination section (83), the abnormality diagnosis section (84), and the processing section (85). However, in the second embodiment, the abnormality diagnosis performed by the abnormality diagnosis section (84) and the predetermined processing action performed by the processing section (85) are different from those of the first embodiment. The impact determination section (83) performs the impact determination in the same manner as in the first embodiment.

In the second embodiment, the abnormality diagnosis section (84) is configured to diagnose whether or not the container (11) has an abnormality, based on whether or not the airtightness of the container (11) is insufficient. In addition, in the second embodiment, the processing section (85) is configured to perform a notification action to cause an alarm by sound or display indicating that the container (11) has an abnormality, as a predetermined processing action to address the abnormality in the container (11).

<Abnormality Diagnosis>

When a strong impact acted on the container (11), a gap is formed between the opening (12) of the container (11) and the casing (20) for closing the opening (12). Thus, the airtightness of the container (11) may become insufficient. In this case, the heat of the air outside the container (11) enters the container (11) during the cooling operation, and the refrigeration cycle unit (30) cannot efficiently cool the interior of the container (11) even though the refrigeration cycle unit (30) exhibits desired performance.

Thus, in the second embodiment, the abnormality diagnosis section (84) is configured to perform a diagnostic operation of controlling the components of the refrigeration cycle unit (30) for diagnosing airtightness of the container (11) to determine whether or not the airtightness is sufficient, and perform the abnormality diagnosis to diagnose whether or not the container (11) has an abnormality, based on the result of the determination when the impact determination section (83) determines that a strong impact acted on the container (11).

In the second embodiment, the abnormality diagnosis section (84) performs the abnormality diagnosis with the first power source (91) being in the power-ON state in which electric power can be supplied. Specifically, when the impact determination section (83) determines that a strong impact acted on the container (11) with the first power source (91) being in the power-ON state in which electric power can be supplied, the abnormality diagnosis section (84) performs the abnormality diagnosis immediately. On the other hand, when the impact determination section (83) determines that a strong impact acted on the container (11) with the first power source (91) being in the power-OFF state in which electric power cannot be supplied, the abnormality diagnosis section (84) performs the abnormality diagnosis after the first power source (91) is switched to the power-ON state from the power-OFF state (e.g., the first power source (91) is switched to the power-ON state by the user to cool the interior of the container (11)).

Specifically, the abnormality diagnosis section (84) first continuously performs a cooling action similar to the cooling operation being a normal operation for a predetermined set time, as the diagnostic operation, and performs a defrosting action similar to the normal defrosting operation when a condition for starting the defrosting operation (the difference (EOS-EIS) in temperature in the evaporator (35) is smaller than a reference value X1) is satisfied during the cooling operation. The set time of the cooling action is set to time for which the air in the container (11) is cooled to a temperature equal to or lower than a dew point temperature, to condense and dehumidify moisture in the air.

Figure 7:
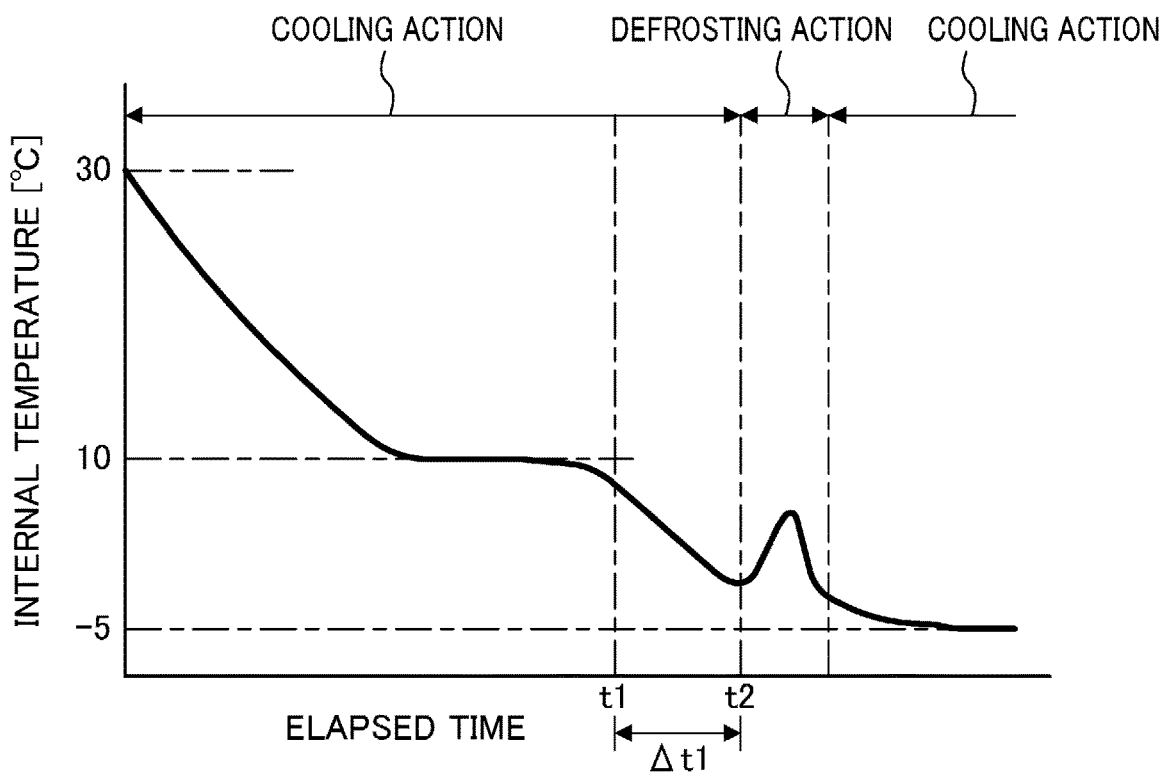
FIG. 7 is a graph illustrating a relationship between a temperature inside the container and time that has elapsed during a diagnostic operation of a second embodiment.

As shown in FIG. 7, during the cooling action as the diagnostic operation, the air (e.g., 30° C.) in the container (11) is gradually cooled to the dew point temperature (e.g., 10° C.) or lower. Thus, moisture in the air is condensed, and the air is dehumidified. On the other hand, in the evaporator (35), moisture in the air passing through the evaporator (35) attaches to the surface of the evaporator (35), and turns to frost. When the amount of frost formed on the evaporator (35) increases, and the difference (EOS-EIS) between the temperature EIS of the refrigerant flowing into the evaporator (35) and the temperature EOS of the refrigerant flowing out of the evaporator (35) becomes smaller than the reference value X1, after predetermined set time has elapsed since the start of the cooling action, the defrosting action is performed.

In the diagnostic operation, the abnormality diagnosis section (84) measures time $\Delta t1$ from a time point t1 when a predetermined set time has elapsed since the start of the cooling action to a time point t2 when the defrosting action was started. Then, the abnormality diagnosis section (84) determines whether or not the airtightness is sufficient, based on the length of the time $\Delta t1$ from the time point t1 when a predetermined set time has elapsed since the start of the cooling action to the time point t2 when the defrosting action was started.

Specifically, when a strong impact acted on the container (11), a gap is formed between the opening (12) of the container (11) and the casing (20) for closing the opening (12). Subsequently, outside air enters the container (11), and the moisture contained in the outside air also enters the container (11), during the cooling action in the diagnostic operation. Therefore, in such a case, the rate of increase in the amount of the frost on the evaporator (35) is higher than that when the container (11) has sufficient airtightness, thereby causing earlier start of the defrosting action.

Thus, if the time $\Delta t1$ from the time point t1 when the predetermined set time has elapsed since the start of the cooling action to the time point t2 when the defrosting action was started is shorter than a predetermined reference time $\Delta ts1$, that is, when the rate of increase in the amount of the frost on the evaporator (35) is high, the abnormality diagnosis section (84) determines that the airtightness of the container (11) is insufficient and diagnoses that the container (11) has an abnormality. On the other hand, if the time $\Delta t1$ from the time point t1 when the predetermined set time has elapsed since the start of the cooling action to the time point t2 when the defrosting action was started is longer than the predetermined reference time $\Delta ts1$, that is, when the rate of increase in the amount of the frost on the evaporator (35) is low, the abnormality diagnosis section (84) determines that the airtightness of the container (11) is sufficient and diagnoses that the container (11) has no abnormality.

The predetermined reference time $\Delta t1$ used for the determination may be corrected according to the humidity condition of the outside air.

<Processing Action>

In the second embodiment, the processing section (85) performs the notification action to notify that the container (11) has an abnormality, with a sound alarm or a display alarm, as the predetermined processing action to address the abnormality in the container (11).

In the second embodiment, the abnormality diagnosis section (84) performs the abnormality diagnosis with the first power source (91) being in the power-ON state in which electric power can be supplied. Thus, when the abnormality diagnosis section (84) diagnoses that the container (11) has an abnormality, the processing section (85) performs the notification action immediately.

The notification action allows the user to promptly recognize the abnormality in the container (11) (insufficient airtightness), so that the user can promptly take measures to improve the airtightness of the container (11).

—Advantages of Second Embodiment—

The container refrigeration apparatus (10) of the second embodiment includes a refrigeration cycle unit (30) having a refrigerant circuit (40), and a controller (80) configured to control the operation of the refrigeration cycle unit (30) to adjust the temperature of air in the container (11) to a desired temperature. In the container refrigeration apparatus (10) of the second embodiment, the controller (80) includes an impact determination section (83) configured to determine whether or not a strong impact acted on the container (11), and an abnormality diagnosis section (84) configured to perform abnormality diagnosis to diagnose whether or not the container (11) has an abnormality when the impact determination section (83) determines that a strong impact acted on the container (11).

In the second embodiment, the controller (80) is configured to determine whether or not a strong impact acted on the container (11), and perform an abnormality diagnosis to diagnose whether or not the container (11) has an abnormality when the controller (80) determines that a strong impact acted on the container (11). As described above, in the second embodiment, the abnormality diagnosis is performed as a consequence of a strong impact acted on the container (11). This allows recognition of an abnormality such as breakage of the container (11) occurred due to a strong impact that acted on the container (11) without waiting until the timing of the next automatic self-diagnostic operation. Accordingly, the second embodiment enables the container refrigeration apparatus (10) that allows prompt recognition of an abnormality occurred in the container (11) due to a strong impact acted on the container (11) to be provided.

In addition to the foregoing configurations, in the container refrigeration apparatus (10) of the second embodiment, the abnormality diagnosis section (84) performs the diagnostic operation of making the refrigerant circuit (40) perform the refrigeration cycle to diagnose the performance of the container (11), thereby determining whether or not the performance of the container (11) is sufficient, based on the operating state of the diagnostic operation, and if the abnormality diagnosis section (84) determines that the performance of the container (11) is insufficient, it diagnoses that the container (11) has an abnormality, and if the abnormality diagnosis section (84) determines that the performance of the container (11) is sufficient, it diagnoses that the container (11) has no abnormality.

As described above, in the second embodiment, the abnormality diagnosis section (84) is configured to perform the diagnostic operation of making the refrigerant circuit (40) perform the refrigeration cycle to diagnosis the performance of the container (11), thereby determining whether or not the performance of the container (11) is sufficient based on the operating state of the diagnostic operation, and to diagnose whether or not the container (11) has an abnormality based on the result of the determination, in the abnormality diagnosis. When the container (11) is damaged due to a strong impact acted on the container (11), which causes an abnormality such as a decrease in airtightness or heat insulation of the container (11), such a configuration allows the abnormality to be promptly recognized. Accordingly, the second embodiment enables prompt addressing of the decrease in airtightness or heat insulation of the container (11) due to the strong impact acted on the container (11).

—First Variation of Second Embodiment—

The container refrigeration apparatus (10) of a first variation of the second embodiment is obtained by changing the abnormality diagnosis performed by the abnormality diagnosis section (84) in the container refrigeration apparatus (10) of the second embodiment.

In the first variation of the second embodiment, abnormality diagnosis section (84) is configured to the perform diagnostic operation of controlling the components of the refrigeration cycle unit (30) to diagnose airtightness of the container (11), thereby determining whether or not the airtightness is sufficient based on the operating state of the diagnostic operation, and to perform abnormality diagnosis of diagnosing whether or not the container (11) has an abnormality based on the result of the determination when the impact determination section (83) determines that a strong impact acted on the container (11). On the other hand, the abnormality diagnosis section (84) determines that whether or not the airtightness of the container (11) is sufficient in the first variation of the second embodiment in a different manner as that of the second embodiment.

Figure 8:
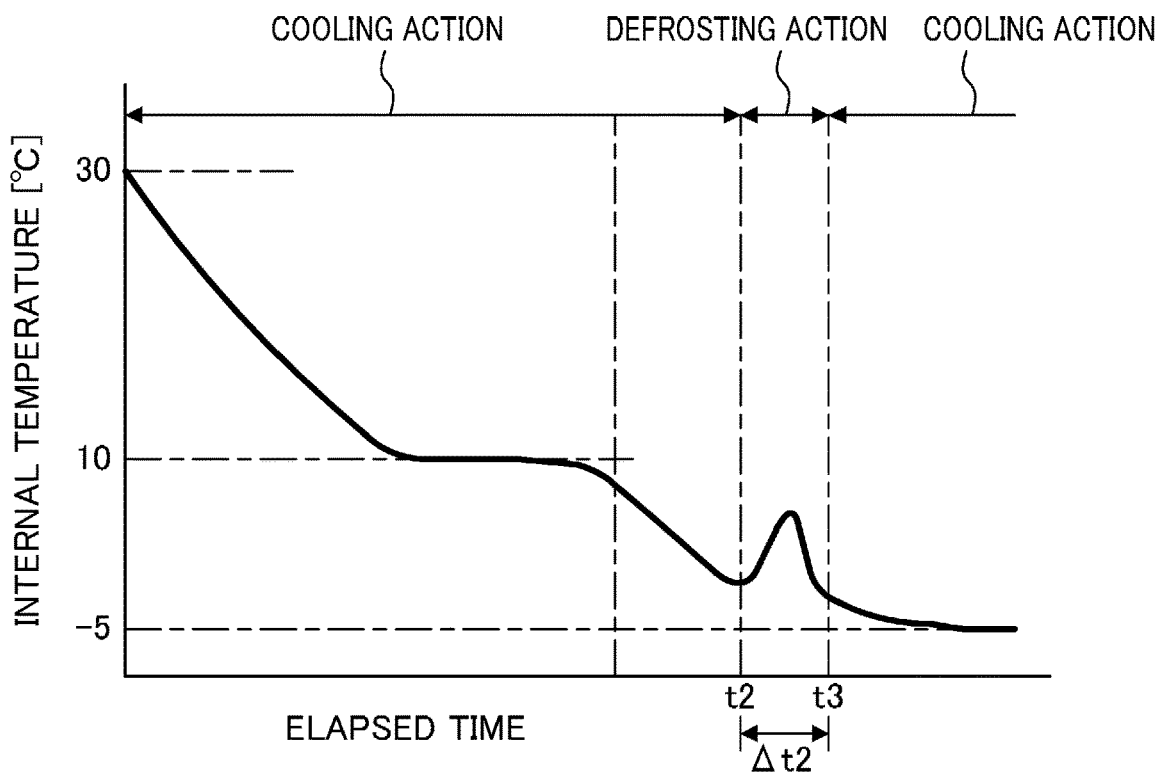
FIG. 8 is a graph illustrating a relationship between a temperature inside the container and time that has elapsed during a diagnostic operation of a first variation of the second embodiment.

Specifically, in the second embodiment, the abnormality diagnosis section (84) determines whether or not the airtightness is sufficient based on the length of the time Δt1 from the time point t1 when a predetermined set time has elapsed since the start of the cooling action to the time point t2 when the defrosting action was started. However, in the first variation of the second embodiment, the abnormality diagnosis section (84) determines that whether or not the airtightness is sufficient based on the length of time for which the defrosting action is performed, that is, the length of time Δt2 from the time point t2 when the defrosting action was started to a time point t3 when the defrosting action was ended, as shown in FIG. 8.

More specifically, when a strong impact acted on the container (11), a gap is formed between the opening (12) of the container (11) and the casing (20) for closing the opening (12). Subsequently, outside air enters the container (11), and the moisture contained in the outside air also enters the container (11), during the cooling action performed as the diagnostic operation. Therefore, in such a case, the rate of increase in the amount of the frost on the evaporator (35) and the amount of the frost on the evaporator (35) at the time point when the defrosting action is started are higher than those when the container (11) has sufficient airtightness, thereby requiring more time to remove the frost.

Thus, in the first variation of the second embodiment, if the time Δt2 from the time point t2 when the defrosting action was started to the time point t3 when the defrosting action was ended is longer than predetermined reference time Δts2, the abnormality diagnosis section (84) determines that the amount of the frost on the evaporator (35) is large, and the airtightness of the container (11) is insufficient and diagnoses that the container (11) has an abnormality. On the other hand, if the time Δt2 from the time point t2 when the defrosting action was started to the time point t3 when the defrosting action was ended is shorter than the predetermined reference time Δts2, the abnormality diagnosis section (84) determines that the amount of the frost on the evaporator (35) is small, and the airtightness of the container (11) is sufficient and diagnoses that the container (11) has no abnormality.

The predetermined reference time Δt2 used for the determination may be corrected according to the humidity condition of the outside air.

Third Embodiment

A third embodiment will be described with reference to the drawings. The container refrigeration apparatus (10) of the third embodiment is obtained by changing the abnormality diagnosis performed by the abnormality diagnosis section (84) and the predetermined processing action performed by the processing section (85) in the container refrigeration apparatus (10) of the first embodiment. The predetermined processing action performed by the processing section (85) is the same as that in the second embodiment. Thus, the abnormality diagnosis performed by the abnormality diagnosis section (84) will be described below.

<Abnormality Diagnosis>

Similarly to the second embodiment, in the third embodiment, the abnormality diagnosis section (84) is configured to perform the diagnostic operation of controlling the components of the refrigeration cycle unit (30) to diagnose airtightness of the container (11), thereby determining whether or not the airtightness is sufficient, and to perform abnormality diagnosis to diagnose whether or not the container (11) has an abnormality, based on the result of the determination, when the impact determination section (83) determines that a strong impact acted on the container (11). The diagnostic operation and determination of the airtightness are performed in different manners from those of the second embodiment.

Similarly to the second embodiment, in the third embodiment, the abnormality diagnosis section (84) performs the abnormality diagnosis with the first power source (91) being in the power-ON state in which electric power can be supplied. Specifically, when the impact determination section (83) determines that a strong impact acted on the container (11) with the first power source (91) being in the power-ON state in which electric power can be supplied, the abnormality diagnosis section (84) performs the abnormality diagnosis immediately. On the other hand, when the impact determination section (83) determines that a strong impact acted on the container (11) with the first power source (91) being in the power-OFF state in which the electric power cannot be supplied, the abnormality diagnosis section (84) performs the abnormality diagnosis after the first power source (91) is switched to the power-ON state from the power-OFF state (e.g., the first power source (91) is switched to the power-ON state by the user to cool the interior of the container (11)).

Specifically, the abnormality diagnosis section (84) first continuously performs a cooling action similar to the cooling operation being a normal operation for a predetermined set time, as the diagnostic operation, and performs a defrosting action similar to the normal defrosting operation when a predetermined set time has elapsed since the time point when the cooling action was started. The condition for ending the defrosting action is the same as that in the defrosting operation being a normal operation, and when the difference (EOS-EIS) in the temperature in the evaporator (35) becomes larger than a reference value X2, the abnormality diagnosis section (84) ends the defrosting action and restarts the cooling action.

When the cooling action is performed as the diagnostic operation, the air (e.g., at 30° C.) in the container (11) is gradually cooled to the dew point temperature (e.g., 10° C.) or lower. Thus, moisture in the air is condensed, and the air is dehumidified. On the other hand, in the evaporator (35), moisture in the air passing through the evaporator (35) attaches to the surface of the evaporator (35), and turns to frost. As a result, when the predetermined set time has elapsed since the start of the cooling action, the defrosting action starts regardless of the amount of the frost on the evaporator (35), and the frost on the evaporator (35) is gradually melted and fallen off from the heat transfer tubes.

When the difference (EOS-EIS) in the temperature in the evaporator (35) becomes larger than the reference value X2, the defrosting action is ended, and the cooling action is restarted.

The abnormality diagnosis section (84) is configured to perform such a diagnostic operation and compare the time for which the defrosting action is repeatedly performed with the time for which the preceding defrosting action is performed, to determine whether or not the airtightness of the container (11) is sufficient.

Specifically, when the airtightness of the container (11) is sufficient, the humidity of air in the container (11) decreases and the amount of frost on the evaporator (35) decreases with alternate repeating of the cooling action and the defrosting action in the diagnostic operation. Thus, the time for which the defrosting action is performed becomes shorter than the time for which the preceding defrosting action is performed.

Therefore, the abnormality diagnosis section (84) compares the time for which the current defrosting operation is performed (e.g., Δtd2 in FIGS. 9A and 9B) with the time for which the preceding defrosting action is performed (e.g., Δtd1 in FIGS. 9A and 9B). Then, as shown in FIG. 9A, if the time for which the defrosting action is performed is shorter than the time for which the preceding defrosting action is performed, the abnormality diagnosis section (84) determines that the airtightness of the container (11) is sufficient and diagnoses that the container (11) has no abnormality. On the other hand, as shown in FIG. 9B, if the time for which the defrosting action is performed is not shorter than time for which the preceding defrosting action is performed (the time for which the defrosting action is performed is the same as or longer than the time for which the preceding defrosting action is performed), the abnormality diagnosis section (84) determines that the airtightness of the container (11) is insufficient and diagnoses that the container (11) has an abnormality. —First Variation of Third Embodiment—

The container refrigeration apparatus (10) of a first variation of the third embodiment is obtained by changing the abnormality diagnosis of the abnormality diagnosis section (84) in the container refrigeration apparatus (10) of the third embodiment.

In the first variation of the third embodiment, the abnormality diagnosis section (84) alternately repeats the cooling action and the defrosting action similar to the cooling operation and the defrosting operation being normal operations, as the diagnostic operation. On the other hand, in the configuration of the third embodiment, the time for which the cooling action is performed is set to be constant (predetermined set time), and the airtightness of the container (11) is determined based on the time for which the defrosting action is performed, whereas in configuration of the first variation of the third embodiment, the time for which the defrosting action is performed is set to be constant (predetermined set time), and the airtightness of the container (11) is determined based on the time for which the cooling action is performed.

Specifically, the abnormality diagnosis section (84) first performs the cooling action similar to the cooling operation being a normal operation, as the diagnostic operation, and when the difference (EOS-EIS) between the temperature EIS of the refrigerant flowing into the evaporator (35) and the temperature EOS of the refrigerant flowing out of the evaporator (35) is smaller than the reference value X1, the abnormality diagnosis section (84) continuously performs the defrosting action similar to the normal defrosting operation for a predetermined set time. When the predetermined set time has elapsed since the start time of the defrosting action, the abnormality diagnosis section (84) ends the defrosting action and restarts the cooling action.

When the cooling action is performed as the diagnostic operation, the air (e.g., at 30° C.) in the container (11) is gradually cooled to the dew point temperature (e.g., 10° C.) or lower. Thus, moisture in the air is condensed, and the air is dehumidified. On the other hand, in the evaporator (35), moisture in the air passing through the evaporator (35) attaches to the surface of the evaporator (35), and turns to frost. As a result, when the difference (EOS-EIS) in the temperature in the evaporator (35) becomes smaller than the reference value X1, the defrosting action is started, and the frost on the evaporator (35) is gradually melted and is fallen off from the heat transfer tubes. When the predetermined set time has elapsed since the start time of the defrosting action, the defrosting action is ended, and the cooling action is restarted.

The abnormality diagnosis section (84) is configured to perform such a diagnostic operation and compare the time for which the cooling action is repeatedly performed with the time for which the preceding cooling operation is performed, to determine whether or not the airtightness of the container (11) is sufficient.

Specifically, when the airtightness of the container (11) is sufficient, the humidity of air in the container (11) decreases and the frost is less likely to be formed on the evaporator (35), with alternate repeating of the cooling action and the defrosting action in the diagnostic operation. Thus, the time for which the cooling action is performed becomes longer than the time for which the preceding cooling action is performed.

Therefore, the abnormality diagnosis section (84) compares the time for which the current cooling action is performed (e.g., Δtc2 in FIGS. 10A and 10B) with the time for which the preceding cooling operation is performed (e.g., Δtc1 in FIGS. 10A and 10B). If the time for which the cooling action is performed is not longer than time for which the preceding cooling action is performed (if the time for which the cooling action is performed is the same or shorter than the time for which the precedent cooling action is performed), the abnormality diagnosis section (84) determines that the airtightness of the container (11) is insufficient, and diagnoses that the container (11) has an abnormality. On the other hand, if the time for which the cooling action is performed is longer than the time for which the preceding cooling operation is performed, the abnormality diagnosis section (84) determines that the airtightness of the container (11) is sufficient, and diagnoses that the container (11) has no abnormality.

Fourth Embodiment

A fourth embodiment will be described with reference to the drawings. The container refrigeration apparatus (10) of the fourth embodiment is obtained by changing the abnormality diagnosis performed by the abnormality diagnosis section (84) and the predetermined processing action performed by the processing section (85) in the container refrigeration apparatus (10) of the first embodiment. The predetermined processing action performed by the processing section (85) is the same as that in the second embodiment. Thus, the abnormality diagnosis performed by the abnormality diagnosis section (84) will be described below.

<Abnormality Diagnosis>

Similarly to the second embodiment, in the fourth embodiment, the abnormality diagnosis section (84) is configured to perform the abnormality diagnosis to diagnose whether or not the container (11) has an abnormality when the impact determination section (83) determines that a strong impact acted on the container (11). In the configuration of the fourth embodiment, the abnormality diagnosis is performed as follows. The diagnostic operation of controlling components of the refrigeration cycle unit (30) to diagnoses the airtightness and the heat insulation of the container (11) is performed, and airtightness determination to determine whether or not the airtightness is sufficient, and heat insulation determination to determine whether or not the heat insulation is sufficient are then performed. Whether or not the container (11) has an abnormality is thereafter diagnosed based on the results of the determinations.

Similarly to the second embodiment, in the fourth embodiment, the abnormality diagnosis section (84) performs the abnormality diagnosis with the first power source (91) being in the power-ON state in which electric power can be supplied. Specifically, when the impact determination section (83) determines that a strong impact acted on the container (11) with the first power source (91) being in the power-ON state in which electric power can be supplied, the abnormality diagnosis section (84) performs the abnormality diagnosis immediately. On the other hand, when the impact determination section (83) determines that a strong impact acted on the container (11) with the first power source (91) being in the power-OFF state in which the electric power cannot be supplied, the abnormality diagnosis section (84) performs the abnormality diagnosis after the first power source (91) is switched to the power-ON state from the power-OFF state (e.g., the first power source (91) is switched to the power-ON state by the user to cool the interior of the container (11)).

Specifically, the abnormality diagnosis section (84) first performs a cooling action similar to the cooling operation being a normal operation, as the diagnostic operation. When the inside air is cooled to a predetermined target temperature (e.g., 5° C.), the cooling action is ended, and a pause action is performed. In the pause action, the compressor (31) is stopped, thereby substantially stopping the cooling function of the evaporator (35). On the other hand, the internal fan (36) operates continuously even after the transition from the cooling action to the pause action. The pause action is continuously performed for a predetermined set period (t set). When the predetermined set period (t set) has elapsed since the start of the pause action, the abnormality diagnosis section (84) ends the pause action and restarts the cooling action.

When the cooling action is performed as the diagnostic operation, air in the container (11) is gradually cooled, and when the temperature of the air reaches a target temperature (e.g., 5° C.), the cooling action is ended, and the pause action is performed. When the compressor (31) is stopped in the pause action, the cooling function of the evaporator (35) is also substantially stopped, and the temperature of the inside air gradually increases.

If the airtightness and heat insulation of the container (11) are insufficient, the heat of the air outside the container (11) enters the container (11), thereby relatively increasing the slope of the increase in the temperature of the inside air during the pause action. Conversely, if the airtightness and heat insulation of the container (11) are sufficient, the slope of the increase in the temperature of the inside air during the pause action becomes gentle. Further, if the airtightness of the container (11) is insufficient, outside air with a higher humidity than the inside air enters the container (11), thereby increasing the humidity of the inside air during the pause action. Conversely, when the airtightness of the container (11) is sufficient, the humidity of the inside air does not increase during the pause action.

Therefore, in the fourth embodiment, the abnormality diagnosis section (84) diagnoses whether or not the container (11) has an abnormality based on changes in the temperature and the humidity of the inside air during the pause action.

Figure 11:
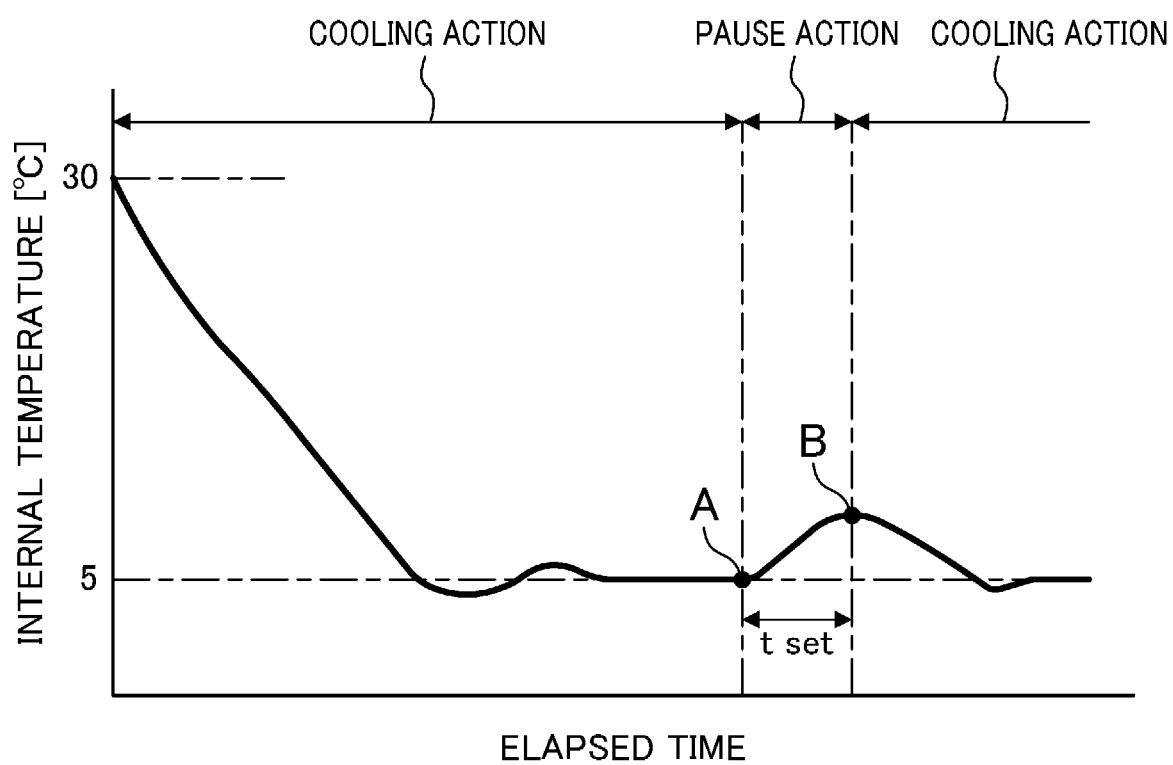
FIG. 11 is a graph illustrating a relationship between a temperature inside the container and time that has elapsed during a diagnostic operation of a fourth embodiment.

Specifically, the abnormality diagnosis section (84) detects, with the suction temperature sensor (70), the internal temperatures (TA and TB) at the start of the pause action (point A in FIG. 11) and at the end of the pause action (point B in FIG. 11). When the difference (TA−TB) between the internal temperatures at the start and the end of the pause action is larger than a reference value X3 (e.g., 0), the abnormality diagnosis section (84) determines that the airtightness of the container (11) is insufficient, and when the difference (TA−TB) between the internal temperatures at the start and the end of the pause action is equal to or smaller than the reference value X3, the abnormality diagnosis section (84) determines that the airtightness of the container (11) is sufficient.

Further, the abnormality diagnosis section (84) detects, using the internal humidity sensor (72), the internal humidities (HA and HB) at the start of the pause action (point A in FIG. 11) and at the end of the pause action (point B in FIG. 11). When the difference (HA−HB) between the internal humidities at the start and the end of the pause action is larger than a reference value X4, the abnormality diagnosis section (84) determines that the heat insulation of the container (11) is insufficient, and when the difference (HA−HB) between the internal humidities at the start and the end of the pause action is equal to or smaller than the reference value X4, the abnormality diagnosis section (84) determines that the heat insulation of the container (11) is sufficient.

The abnormality diagnosis section (84) diagnoses whether or not the container (11) has an abnormality based on the results of the airtightness determination and the heat insulation determination. Specifically, when the abnormality diagnosis section (84) determines that at least one of the airtightness performance or the heat insulation performance of the container (11) is insufficient, the abnormality diagnosis section (84) diagnoses that the container (11) has an abnormality. On the other hand, when the abnormality diagnosis section (84) determines that both the airtightness performance and the heat insulation performance of the container (11) are sufficient, the abnormality diagnosis section (84) diagnoses that the container (11) has no abnormality.

Note that the reference values X3 and X4 are values determined empirically or theoretically. The reference value X4, in particular, is determined in consideration of the amount of heat generated by the internal fan (36) during the operation.

Other Embodiments

Figure 12:
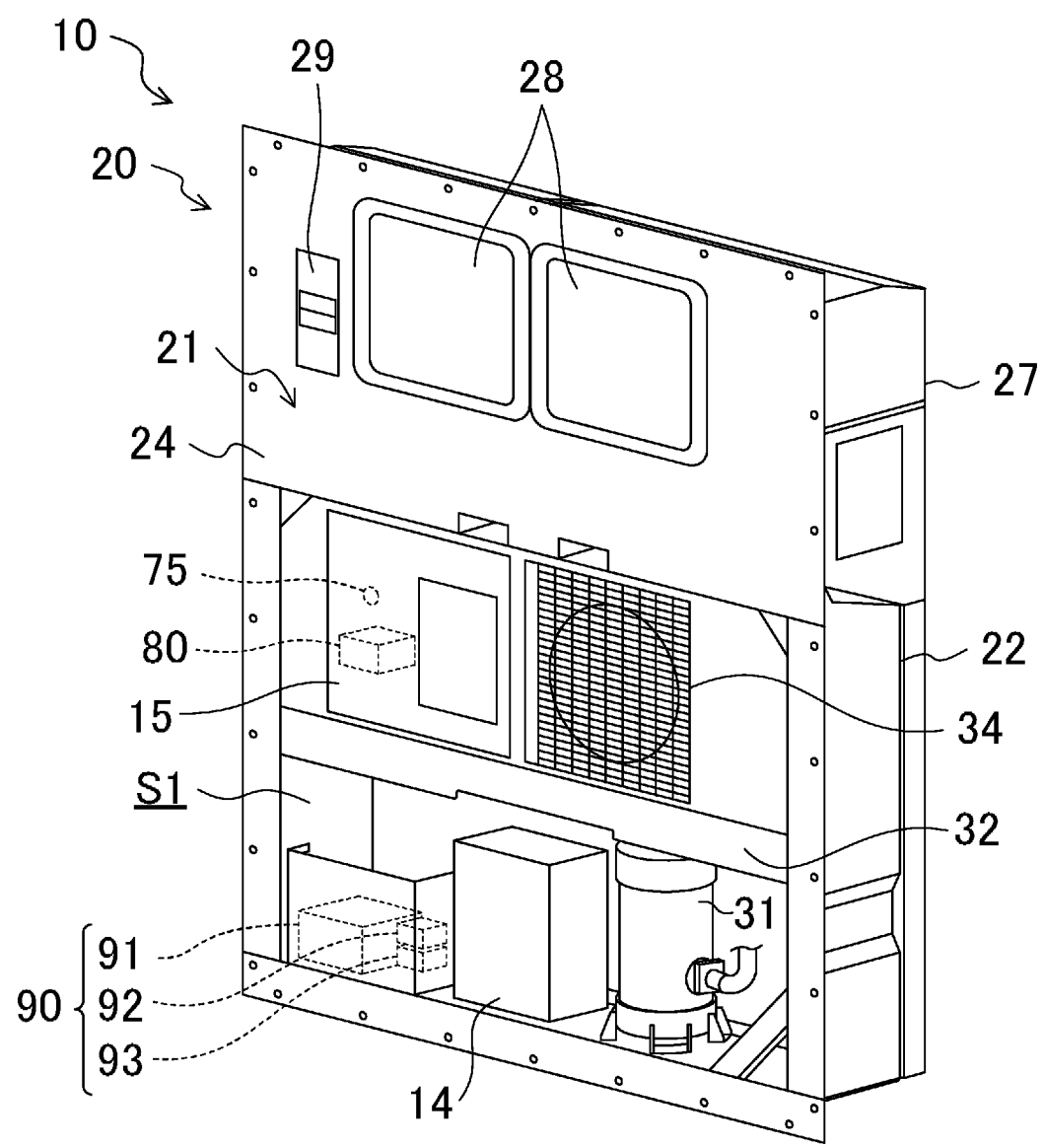
FIG. 12 is a perspective view of the container refrigeration apparatus of another embodiment as viewed from outside.

In each of the foregoing embodiments and variations, the GPS receiver (73) is used as a detection unit that detects a physical quantity for determining whether or not a strong impact acted on the container (11), but the detection unit is not limited thereto. As shown in FIG. 12, instead of the GPS receiver (73), an impact sensor (75) may be provided.

Specifically, the container refrigeration apparatus (10) shown in FIG. 12 includes the impact sensor (75) provided in the container refrigeration apparatus (10) and configured to detect an acceleration. The impact determination section

(83) is configured to determine that a strong impact acted on the container (11) when the value detected using the impact sensor (75) is equal to or greater than a predetermined value (e.g., 50 G), and to determine that a strong impact did not act on the container (11) when the value detected using the impact sensor (75) is smaller than the predetermined value (e.g., 50 G). Such a configuration allows easy, accurate determination of whether or not a strong impact acted on the container (11).

The processing section (85) of the first embodiment is configured to perform the refrigerant discharge action as the predetermined processing action to address the abnormality in the container refrigeration apparatus (10), but, similarly to the second embodiment, the processing section (85) of the first embodiment may be configured to perform the notification action to notify that the container refrigeration apparatus (10) has an abnormality, with a sound alarm or a display alarm. In this case, similarly to the refrigerant discharge action of the first embodiment, the processing section (85) is configured to perform the notification action immediately after the abnormality diagnosis when the first power source (91) is in the power-ON state, and perform the notification operation after the first power source (91) is switched to the power-ON state from the power-OFF state when the first power source (91) is in the power-OFF state.

In the first embodiment, the abnormality diagnosis section (84) is configured to perform the abnormality diagnosis to diagnose whether or not the container refrigeration apparatus (10) has an abnormality. In the second to fourth embodiments and the variations, the abnormality diagnosis section (84) is configured to perform the abnormality diagnosis to diagnose whether or not the container (11) has an abnormality. The abnormality diagnosis section (84) may be configured to perform the abnormality diagnosis to diagnose whether or not at least one of the container (11) or the container refrigeration apparatus (10) has an abnormality, or may be configured to perform the abnormality diagnosis to diagnose whether or not both the container (11) and the container refrigeration apparatus (10) have an abnormality.

While the embodiments and variations have been described above, it will be understood that various changes in form and details can be made without departing from the spirit and scope of the claims. The above embodiments and variations may be appropriately combined or replaced as long as the functions of the target of the present disclosure are not impaired.

INDUSTRIAL APPLICABILITY

As described above, the present disclosure is useful for a container refrigeration apparatus.

EXPLANATION OF REFERENCES

10 Container Refrigeration Apparatus
11 Container
12 Opening
20 Casing
29 Ventilator (Ventilating Device)
30 Refrigeration Cycle Unit
31 Compressor
32 Radiator
35 Evaporator
36 Internal Fan
40 Refrigerant Circuit
73 GPS Receiver
74 Refrigerant Sensor (Refrigerant Leakage Detection Unit)
75 Impact Sensor
80 Controller (Control Unit)
83 Impact Determination Section
84 Abnormality Diagnosis Section
85 Processing Section
91 First Power Source
92 Second Power Source

The invention claimed is:
1. A container refrigeration apparatus comprising:
a refrigeration cycle unit having
a refrigerant circuit in which at least a radiator and an evaporator are connected,
an external fan provided in the vicinity of the radiator, and
an internal fan provided in the vicinity of the evaporator; and
a controller configured to:
control an action of the refrigeration cycle unit to adjust a temperature of inside air in a container to a desired temperature,
determine whether or not a strong impact acted on the container, and
perform an abnormality diagnosis to diagnose whether or not at least one of the container or the container refrigeration apparatus has an abnormality when the controller determines that the strong impact acted on the container, and
the container refrigeration apparatus further comprising:
a detecting sensor configured to detect a physical quantity for determining whether or not the strong impact acted on the container by the controller, and transmit the physical quantity to the controller;
a first electric power supplier connected to components of the refrigeration cycle unit and configured to supply electric power to the components; and
a secondary electric power supplier separate from the first electric power supplier and configured to supply electric power to the controller and the detecting sensor, wherein
the first electric power supplier is connected to at least the external fan and the internal fan, and
the secondary electric power supplier is configured to enable the detecting sensor to detect and transmit the physical quantity to the controller for determining whether or not the strong impact acted on the container, during a time in which the first electric power supplier is in a power-OFF state.
2. The container refrigeration apparatus of claim 1, further comprising
a refrigerant sensor provided in the container and configured to detect the leakage of the refrigerant from the refrigerant circuit, wherein
in the abnormality diagnosis, the controller determines whether or not the refrigerant has leaked from the refrigerant circuit based on the value detected using the refrigerant sensor, and if the controller determines that the refrigerant has leaked from the refrigerant circuit, the controller diagnoses that the container refrigeration apparatus has an abnormality.
3. The container refrigeration apparatus of claim 2, further comprising
another secondary electric power supplier separate from the first electric power supplier, wherein
the refrigerant sensor is connected to the first electric power supplier and the another secondary electric power supplier and, if the controller diagnoses that the strong impact acted on the container with the first electric power supplier being in a power-ON state in which electric power can be supplied, the controller makes the first electric power supplier supply electric power to the refrigerant sensor to make the refrigerant sensor detect a leakage of the refrigerant from the refrigerant circuit, and if the controller diagnoses that the strong impact acted on the container with the first electric power supplier being in the power-OFF state in which electric power cannot be supplied, the controller makes the another secondary electric power supplier supply electric power to the refrigerant sensor to make the refrigerant sensor detect a leakage of the refrigerant from the refrigerant circuit.

4. The container refrigeration apparatus of claim 1, further comprising
a Global Positioning System (GPS) receiver configured to detect positional information of the container, wherein
the controller calculates an impact value acted on the container based on a change in positional information of the container detected with the Global Positioning System (GPS) receiver, and if the calculated impact value is equal to or greater than a predetermined value, the controller determines that the strong impact acted on the container.

5. The container refrigeration apparatus of claim 1, further comprising
an impact sensor configured to detect an acceleration, wherein
if a value of the acceleration detected using the impact sensor is equal to or greater than a predetermined value, the controller determines that the strong impact acted on the container.

6. The container refrigeration apparatus of claim 1, wherein
the controller performs the abnormality diagnosis after a predetermined time has elapsed since the controller determined that the strong impact acted on the container.

* * * * *